(12) United States Patent
Winger

(10) Patent No.: US 11,720,644 B2
(45) Date of Patent: Aug. 8, 2023

(54) SYSTEM AND SERVER FOR PARALLEL PROCESSING MIXED INTEGER PROGRAMS FOR LOAD MANAGEMENT

(71) Applicant: Pacific Gas and Electric Company, San Francisco, CA (US)

(72) Inventor: Laura Winger, Rancho Mirage, CA (US)

(73) Assignee: Pacific Gas and Electric Company, San Francisco, CA (US)

( * ) Notice: Subject to any disclaimer, the term of this patent is extended or adjusted under 35 U.S.C. 154(b) by 641 days.

(21) Appl. No.: 16/775,568

(22) Filed: Jan. 29, 2020

(65) Prior Publication Data
US 2020/0242188 A1 Jul. 30, 2020

Related U.S. Application Data

(60) Provisional application No. 62/798,995, filed on Jan. 30, 2019.

(51) Int. Cl.
*G06F 17/12* (2006.01)
*G06Q 50/06* (2012.01)
*G06Q 10/0631* (2023.01)
*G06F 9/38* (2018.01)

(52) U.S. Cl.
CPC ............ *G06F 17/12* (2013.01); *G06F 9/3851* (2013.01); *G06Q 10/06315* (2013.01); *G06Q 50/06* (2013.01)

(58) Field of Classification Search
CPC ...... G06F 17/12; G06F 9/3851; G06F 9/5072; G06Q 10/06315; G06Q 50/06; Y02D 10/00
See application file for complete search history.

(56) References Cited

U.S. PATENT DOCUMENTS

| | | | | |
|---|---|---|---|---|
| 2011/0066258 A1* | 3/2011 | Torzhkov | ............... | G05B 17/02 700/29 |
| 2014/0018971 A1* | 1/2014 | Ellis | ....................... | G06Q 10/04 700/297 |
| 2015/0280436 A1* | 10/2015 | Weckx | .............. | H02J 13/00028 700/295 |

(Continued)

OTHER PUBLICATIONS

Gurung, Amit, "Solving Batched Linear Programs on GPU and Multicore CPU", Department of Computer Science & Engineering, National Institute of Technology, Sep. 2016, 31 pgs.

(Continued)

*Primary Examiner* — Mohammad Ali
*Assistant Examiner* — Dhruvkumar Patel
(74) *Attorney, Agent, or Firm* — Greenberg Traurig, LLP

(57) ABSTRACT

The novel use of separate programs to control a parallel execution of a plurality of large scale linear program solvers executing sequentially on separate cores is disclosed. An embodiment detailing the system's use in optimizing a utility company's assets is also disclosed. As upgrades or better programs become available, in some embodiments each program in the system can be replaced without affecting the structure of the other programs. In some embodiments, the use of cloud based architecture allows for improved data collection and system execution as all that is needed to process data at a faster speed is to "rent" the additional physical or virtual cores from the provider.

17 Claims, 19 Drawing Sheets

(56) References Cited

U.S. PATENT DOCUMENTS

2018/0287382 A1* 10/2018 Genc .................. H02J 3/14
2018/0322093 A1* 11/2018 Yanagisawa ............ G06F 8/443

OTHER PUBLICATIONS

Gurung, Amit, et al. "Simultaneous Solving of Linear Programming Problems in GPU", National Institute of Technology Meghalaya, Dec. 2015, 5 pags.

"Spark Parallel Processing Tutorial", retrieved from <https://www.simplileam.com/spark-parallel-processing-tutorial>, 14 pgs.

Mixed-Integer Programming (MIP)—A Primer on the Basics, retrieved from <https://www.gurobi.com/resource/mip-basics/>, 18 pgs.

Dhiantravan, Pear, "Branch and Cut for MINLP", retrieved from <https://optimization.mccormick.northwestern.edu/index.php/Branch_and_cut_for_MINLP>, 2015, 7 pgs.

Luedtke, Jim, "The Branch-and-Cut Algorithm for Solving Mixed-Integer Optimization Problems", IMA New Directions Short Course on Mathematical Optimization, Department of Industrial and Systems Engineering, University of Wisconsin-Madison, Aug. 10, 2016, 50 pgs.

\* cited by examiner

FIG. 6

Demand Reduction Through Targeted Data Analytics
Screening Tool - Grid Overview (A) Asset Asset name [ ▼ ]

(B) Scaled Factor [ 0.95 ▼ ]

(C) Metric [ Scaled Overload 90-1 ▼ ]

Help (D)

| for_year | 1 | 2 | 3 | 4 | 5 | 6 | 7 | 8 | 9 | 10 | 11 | 12 |
|---|---|---|---|---|---|---|---|---|---|---|---|---|
| 2019 | 1,771,147 | 2,791,645 | | | 5,853,106 | 23,171,739 | 27,960,934 | 4,895,980 | 11,316,815 | 9,925,319 | 1,571,853 | 10,307,571 |
| 2020 | 1,719,332 | 2,746,051 | | 399,110 | 5,175,240 | 23,091,432 | 27,485,053 | 4,836,019 | 11,109,480 | 9,747,845 | 1,502,618 | 10,354,843 |
| 2021 | 1,806,936 | 2,871,393 | | 381,928 | 5,463,284 | 23,730,194 | 27,455,704 | 4,973,143 | 11,516,367 | 10,226,901 | 1,710,307 | 10,668,193 |
| 2022 | 2,408,666 | 3,369,533 | | 422,735 | 6,638,143 | 25,791,980 | 28,812,061 | 6,004,459 | 12,817,675 | 11,379,878 | 2,190,154 | 11,891,135 |
| 2023 | 3,178,672 | 3,892,076 | 48,542 | 535,634 | 7,980,974 | 27,864,704 | 30,889,472 | 7,323,838 | 14,063,197 | 12,415,290 | 2,725,617 | 12,724,007 |
| 2024 | 4,022,307 | 4,544,255 | 188,306 | 637,052 | 9,108,254 | 29,593,086 | 34,389,246 | 9,037,421 | 15,494,788 | 13,466,023 | 3,313,999 | 14,258,382 |
| 2025 | 4,817,936 | 5,303,798 | 333,555 | 844,776 | 9,990,069 | 31,919,785 | 36,602,034 | 10,786,700 | 17,164,383 | 14,648,283 | 3,956,297 | 15,815,346 |
| 2026 | 4,946,865 | 5,523,596 | 395,254 | 1,068,151 | 9,992,906 | 32,690,575 | 37,200,274 | 11,192,063 | 17,612,998 | 15,109,189 | 4,278,116 | 16,166,462 |
|   |   |   |   | 1,166,512 |   |   |   |   |   |   |   |   | for_month

Select a year you want to check the overload for the feeder: [ 2026 ▼ ]

(E) Asset A1108: Feeder Overload (kw) [ Scaled Overload 90_1 ▼ ]

Overload kw
0 — 188,807

Date [2026]: Oct 1, Apr 1, Oct 1, Arp 1
for_hour: 2, 4, 6, 8, 10, 12, 14, 16, 18, 20, 22, 24

LoadSEER DER Scenario Allocation:

Employs a load projection approach that is integrated across distribution and transmission planning. The tool currently use 2 scenarios from the annual LoadSEER forecast for distribution planning:

90_1: 1-in-10 weather scenario after projects with no natural DER adoption
90_2: 1-in-10 weather scenario after projects with natural DER adoption forecasted Our model uses a scaled capacity assuming the feeder capacity is at 0.95 of the real capacity in LoadSEER and solve for its solution. The "Scaled Overload 90-1" shows the overload value with this 0.95 scaled assumption. It is created under the thought that DER adoption will not have 100% realization rate, so we want to adopt more DER. This scaling of 0.95 is a model input that can be adjusted by the user.

FIG. 7

SYSTEM AND SERVER FOR PARALLEL PROCESSING MIXED INTEGER PROGRAMS FOR LOAD MANAGEMENT

CROSS-REFERENCE RELATED APPLICATIONS

This application claims the benefit of and priority to U.S. Provisional Application No. 62/798,995, filed Jan. 30, 2019, entitled "SYSTEM AND SERVER FOR PARALLEL PROCESSING MIXED INTEGER PROGRAMS FOR LOAD MANAGEMENT", the entire contents of which are incorporated herein by reference.

BACKGROUND

Pacific Gas and Electric Company (referred to herein as the "utility") has been on the forefront of utilizing "Distributed Energy Resources" ("DERs") to defer or eliminate distribution asset upgrades through targeted demand side management ("TSDM"). However, utility distribution planning tools and processes are in need of further development to facilitate the timely, and cost-effective identification of the lowest cost solution capable of deferring, or completely mitigating asset upgrades.

The California Public Utilities Commission's (CPUC's) energy procurement loading order directs that investor-owned utilities (IOUs) must first attempt to meet increased demand for electricity through energy efficiency (EE) and demand response (DR) enabled demand reduction. If additional new demand exists, renewable source of energy should then be procured. Only when EE, DR, and renewables are unable to safely and reliably fulfill demand expectations should new fossil fuel generation be procured. Targeted demand-side solutions (TDSM) can be considered an extension of the traditional energy procurement loading order to the context of distribution planning. By pursuing distributed energy resource (DER) portfolios, TDSM and utility systems can help to lower utility asset investment requirements, and in turn customer bills, while aligning with state policy goals. DER portfolios recommended by the system can have greenhouse gas (GHG) emissions benefits as well as societal benefits, such as the creation of local jobs associated with the installation of DERs.

A targeted approach for identifying and deploying DER products at specific locations on the distribution grid is useful to achieve sufficient peak load reductions, and mitigate specific and localized capacity and reliability needs. New availability of granular data and data analytics technology may make this targeted approach feasible where the information and technology did not previously exist. At full deployment, a system's potential benefits could include increased electric grid reliability and a reduction in customer bills (affordability) as a result of properly sized and targeted demand reduction through analytics. Additionally, broader deployment could have auxiliary benefits related to the loading order, GHG emissions mitigation, and societal benefits.

Systems are needed that improve the TDSM process and gain more insight into how DERs can be used to affordably improve smart energy grids. New tools are needed that consider both traditional wire solutions and DER portfolios, and provide distribution planners with information on where distribution asset overloads will occur, when these overloads will occur, what solution meets the need at the lowest cost, and which customers are most likely to adopt DERs (and are thus good candidates for targeting.) Further, any new systems and methods that address the gaps/challenges described above need to create a data analytics platform capable of combining and analyzing relevant data from various data sources. Further, these new systems and methods must leverage systems to enable replicable analytics capable of understanding the forecasted overload (magnitude, timing, and duration), and recommending an optimal portfolio of DER products and programs to mitigate forecasted overloads. Further, the system would ideally comprise a modular architecture so that as new policies, programs, and technologies emerge, individual components can be seamlessly updated and exchanged.

SUMMARY

Some embodiments of the present disclosure are directed to a novel approach to creating a system for executing parallel solvers for mixed integer linear optimization according to some embodiments. In the current state of the art, finding solutions to mixed integer linear optimization problems is done by a parallel algorithm executing in conjunction with a sequential algorithm in a single solver program. When multiple nodes are introduced in to such a solver, operations such as determining the order in which the nodes are considered, sorting and pivoting datasets, and enforcing an ordered solver execution can cause system inefficiencies and scalability problems.

In contrast, the present system uses multiple instances of the sequential solving aspects of one or more types of solvers according to some embodiments. In some embodiments, each solver (which can be multiple instances of the same solver) is dedicated to solving a linear program for a single node, and are executed on a respective one of multiple cores of a group computing and/or cloud based computer infrastructure. In some embodiments, the results are then compiled and presented in a dashboard for visualization on the front-end.

One of the many novel features of some embodiments of the system is that the mixed integer programming model used for optimization is created independently of the solver that is chosen to solve the linear program. In some embodiments, an agnostic modeling program sets up the optimization in the appropriate mathematical formulation so that the model is compatible with any solver. In some embodiments, the chosen solver is then used to sequentially solve each sub-node of a node before being assigned the next node: this is in contrast to the prior art where all the nodes and subnodes are loaded onto a single solver for the solver's parallel algorithm to sort through.

In some embodiments, the solver results for a sub-node are then returned to the modeling software. The results of the sub-node are stored and then used for the next round of sub-node linear program solving, taking into account the stored results from the previous iteration according to some embodiments. In some embodiments, this process repeats until all subnodes for a particular node have been solved sequentially. In some embodiments, the solver then begins to process the next node. In some embodiments, the results of each node iteration are stored in a database separate from the other programs in the system, so that errors resulting in a crash from any one program does not result in a loss of all of the previous iteration node and sub-node data. This separation between programs creates a modular system making the overall system more robust than the prior art according to some embodiments.

In some embodiments, each node linear program optimization is run on a single solver operating on a single core. In some embodiments, once a node has been solved, another node is loaded to the solver. The choice for which node to process next is not made by a solver's parallel algorithm as is the case in the prior art according to some embodiments. Instead, in some embodiments, a master-slave architecture program is used to distribute the linear program optimization script to multiple cores in a computer or computer cluster according to some embodiments. In some embodiments, each of the cores executes a single instance of the solver. An added benefit to this arrangement is that different solver programs can be used in parallel, as the master-slave architecture has the ability to send the model to any server specified by at user in some embodiments. For example, in some embodiments, if it is determined that a particular dataset type runs optimally on a particular solver, that dataset can be specified for that solver while other datasets are delivered to different solvers. In some embodiments, this aspect of the present system also increases robustness because its modular arrangement allows for individual component upgrades. For example, if a better solver is developed, it can be implemented by the system without having to change other aspects of the system because every program in the system operates independently of each other according to some embodiments. In some embodiments, this modular arrangement facilitates the ability to upgrade one portion of the system to the latest technology without having to modify the overall modular structure. In some embodiments, this novel approach makes the system easy to scale up, or down, depending on the requirements of the analysis. In the case of cloud based computing, the number of cores available for distribution is limited only by the size of the cloud infrastructure, making scalability almost limitless as it is bound only by this physical constraint in some embodiments. Scalability for linear programming is a known problem in the art and the present system offers a simple yet elegant solution.

In some embodiments, the results from the parallel processing of sequential nodes are stored separately as mentioned above. In some embodiments, the results are then entered into another separate program which is a front-end dashboard configured for visualization of the results. The dashboard can establish a live connection to billions of record dataset solver results in some embodiments. In some embodiments, the front-end dashboard can handle this enormous record set by performing strategic partitioning of the data: the data is filtered on import to the front-end based on user interactions in some embodiments.

In some embodiments, applications for the system stem to any analysis where multiple nodes need to be solved using linear programming. In some embodiments, for an application of the system relating to utility asset optimization presented in the detailed description, the system lends itself well for analysis of the billons of datasets collected by the utility company. In the case of cloud computing, using a centralized cloud based architecture has the added benefit of being able to collect all the parsed datasets located on different utility company servers and consolidate them into a single infrastructure where all the data can be accessed by the system in some embodiments. In some embodiments, the system also uses the cloud infrastructure to create and assign cores to solve the mixed integer model, and to support the visualization software, consolidating multiple individual programs into one unique linear equation solver and visualization platform.

In some embodiments, the inventors have successfully implemented the system in the field of electrical utility grid optimization. In some embodiments, the inventors ran many linear programs/optimizations in parallel, but the individual optimizations themselves were implemented in the stand-alone program Pyomo, which is a Python-based open-source optimization modeling language, and then solved with the CBC (COIN-OR Branch and Cut) solver.

Development for the optimizations in some embodiments took two phases: (1) the inventive team developed the mixed integer programming optimization model in Jupyter® notebooks for a single asset; and (2) moved the model to a pure Python script and used Apache Spark® to submit it in parallel to Spark executors, each executor running on a separate core. In some embodiments, this scalable approach significantly reduced the time it took to process the linear programs as compared to other methods, and allowed all feeders for the entire utility company (or multiple companies) to be analyzed if so desired: all that would be needed are more cores, which are readily available through AWS® in some embodiments.

In some embodiments, the asset chosen by the utility company for optimization were individual feeders that comprise power transmission lines, or wires, that deliver electrical power to consumers. Those of ordinary skill would realize of course the present system would be applicable to optimization of anything that could be represented by a mathematical model. In some embodiments, for each feeder in the system pilot area (476 feeders) the data engineering portions set up the following input data for the optimizations:

(i) Identify the total number of customers connected to that feeder that are matched (likely to adopt and eligible for) to each distributed energy resource (DER) product/program;

(ii) Identify the cost associated with each DER product/program based on a levelized cost methodology;

(iii) Match the hourly load forecasts and feeder capacities from historical data to the hourly load impacts that one of each DER product/program could have on that specific feeder. In some embodiments, this ranges from 76-125 different DER product/program load impact shapes that are considered by the optimization for the optimal portfolio, depending on the feeder's customer matches (if a feeder does not have a customer who is matched to a specific DER product, then that DER product does not enter the optimization for that feeder). In some embodiments, this resulted in 76-125 'decision variables' that needed to be solved for in the optimization.

Additionally, in some embodiments, wires alternatives (grid upgrades) were considered in the exact same way as the DERs in the optimization. In some embodiments, the incremental size in MW and the cost of the wires alternative is an input to the optimization model that can be easily customized by the user before running optimizations.

In some embodiments, from that information an optimization approach (more specifically, a mixed integer program) was designed that identified the optimal portfolio of DERs for a feeder, while also considering a wires upgrade. In some embodiments, in consideration that this was for long term distribution planning, the window for the optimizations was set at one year. In some embodiments, the data for one year was optimized, then that optimal solution was considered still "adopted" in all the following years. Any DER product load impacts associated with those solutions were subtracted from the next year's load forecast before going into the next optimization in some embodiments.

As explained above, in some embodiments, each feeder (i.e., node) was solved independently while multiple feeders were solved in parallel, each solved on a different processing core. The modeling program Python® was used to create the mixed integer programming model that includes a linear program optimization script. The architecture program Apache Spark® was used to distribute a linear program optimization script to each of the plurality of cores. For each core, each year (i.e., each sub-node) was solved in series sequentially for a specific feeder, taking into account any previous years' solutions. A pure Python® script which solves one mixed integer program (in a function) was attached to the main Spark® job, then one executor was assigned to each core by Apache Spark®, then a map function in Apache Spark® was used to send the run_optimization( ) function from the attached python script to each executor in some embodiments.

In some embodiments, the final portfolio created by the system for a particular set of feeders could be all DERs, DERs and wires upgrades, or just wires upgrades, depending on the least cost solution to the optimization problem. Additionally, in some embodiments, the solution must be integers (ie. you cannot have partial wires upgrades or partial DER product adoption). In some embodiments, this is formulated as an optimization to minimize the cost of a DER and/or wires upgrade portfolio where two primary constraints must be met. In some embodiments, these are: (1) the maximum number of a specific DER product available for a feeder is limited by the customer-DER product matches built out in the Data Engineering; and (2) every single forecasted overloaded hour for the year must be resolved by the optimal solution of DERs and/or wire upgrades. Additionally, DERs that cause load increases in some hours (storage and DR) cannot cause any hour of the year to become overloaded in the optimal solution in some embodiments.

The novel use of separate programs to control a parallel execution of a plurality of solvers executing sequentially is an improvement over the prior art. As upgrades or better programs become available, in some embodiments each program can be replaced without affecting the structure of the other programs. In addition, the ability to scale and the ease of scalability that the system offers has been something desired but not achieved by the prior art. In some embodiments, using a cloud based infrastructure, all that is needed to process data at a faster speed is to "rent" the additional physical or virtual cores from the provider. This is a significant cost saving compared to prior art systems as only the exact number of cores that is needed at a particular time period needs to be "rented," and more or less cores are available on demand as needed according to some embodiments.

In addition, in some embodiments all or some of the programs and data (raw and solved) are stored in a database within the cloud infrastructure in some embodiments. In some embodiments, the cloud infrastructure can also include the virtual and/or physical processor cores. In some embodiments, this allows for memory storage needs to be adjusted on demand and allows access to other databases using the same cloud infrastructure. This consolidation of programs, processors, and data improves the speed of the overall system.

DESCRIPTION OF THE DRAWINGS

FIG. 6 illustrates a grid overview tab of the system dashboard in accordance with some embodiments of the invention.

FIG. 7 illustrates an asset load overview tab of the system dashboard in accordance with some embodiments of the invention.

DETAILED DESCRIPTION

Figure 1:
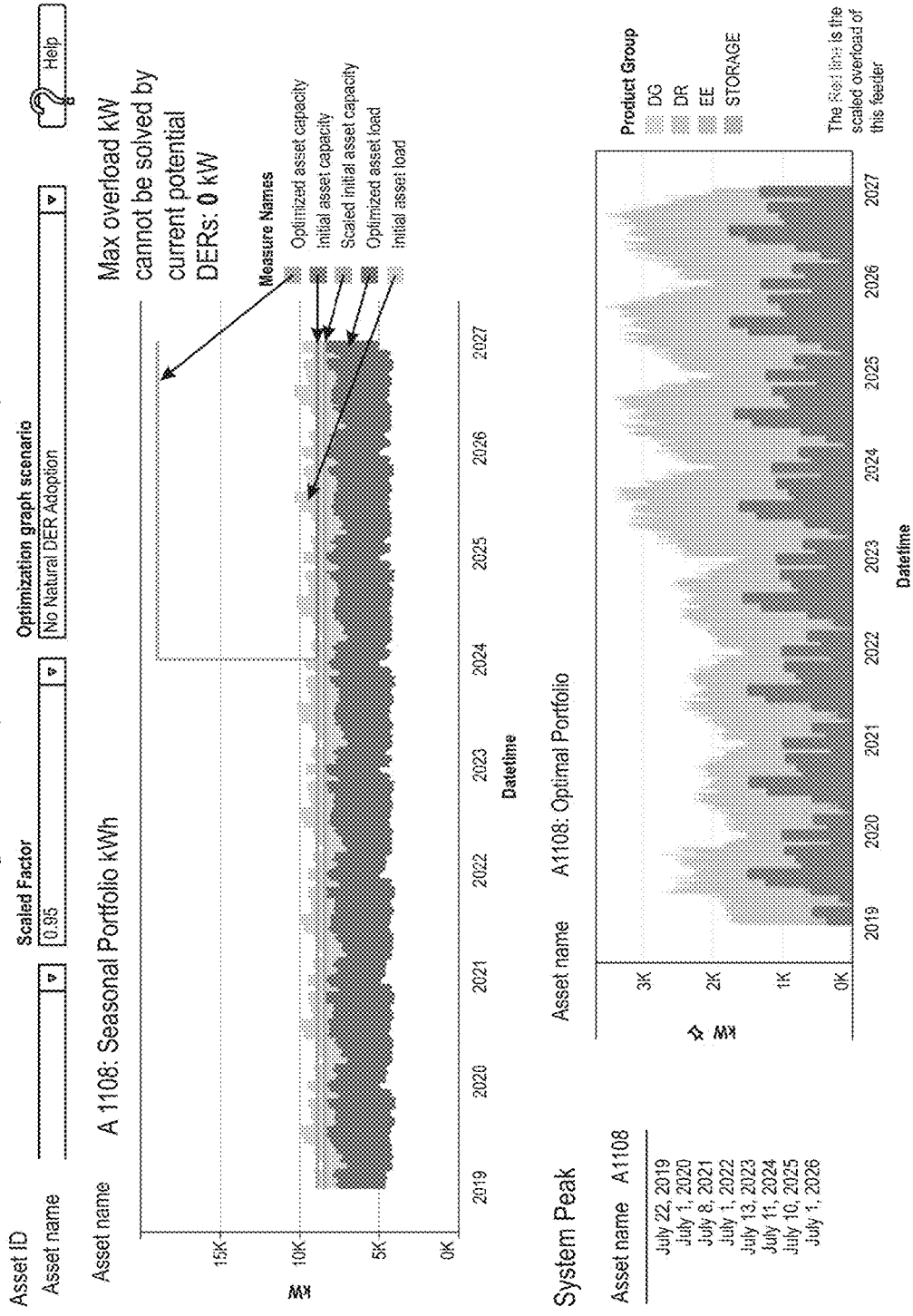
FIG. 1 shows a screenshot of the optimization overview tab of the system user interface in accordance with some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. The term "substantially" as used herein includes a range of ±10% of the unit of measure associated therewith.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Table 1 shows terms, abbreviations, and summary descriptions as used herein.

| Abbreviation | Description |
| --- | --- |
| Bank | A sub-section of the electrical grid, traditionally found at a sub-station and comprised of multiple feeders. |
| BTM | Behind the meter. |
| BIP | Base interruptible program: a supply side DR program for non-residential customers. |
| CAISO | California independent system operator. |
| Capacity | The maximum allowable coincidental electrical load that can be safely and reliably supported by an electrical asset. Unless otherwise noted system uses the term to refer to feeder capacity. |
| CET | Cost effectiveness tool. |
| CPUC | California Public Utilities Commission. |
| DER | Distributed energy resources. Note: for the purposes of system this includes distributed photovoltaic, load modifying demand response, storage, and energy efficiency. |
| DG | Distributed generation, most often referring to rooftop solar photovoltaic installations. |
| Distribution | The distribution portion of the electrical grid that facilitates the movement of lower voltage electricity. Majority of overhead conductors are part of the distribution grid. |
| DPA | Distribution planning area. |
| DR | Demand response. |
| DRP | Distribution resource plan (R. 14-08-013). As required by California Assembly Bill 327 (Perea), the CPUC must review and electric corporations must submit distribution resource planp roposals that will "identify optimal locations for the deployment of distributed resources." |
| EE | Energy efficiency. EE technologies reduce electrical load, while providing a similar level of service. The most common example is a more efficient lightbulb, such as a compact fluorescent, which uses less energy compared to a traditional incandescent bulb. With few exceptions, EE technologies have permanent load impacts and are not dispatchable. |
| Energy storage | The storage of energy in an electric battery, most often of lithium-ion chemistry. Energy storage can be utility or customer owned or sited. |
| EV | Electric vehicle. |
| EUL | Expected useful life (EUL) is a measure of how long, on average, a product or measure will last before it will be replaced. |
| Feeder | Electrical line segments of the distribution grid. |
| GHG | Greenhouse gas. GHGs are primarily produced through the burning of fossil fuels and are a contributor to climate change. |
| Grid | The electric grid. |
| Impact curve | Each DER technology affects a customer's load in a different way. The curves used to represent these impacts are referred to as impact curves. |
| IOU | Investor Owned Utility. |
| kW | Kilowatt. 1,000 watts; kW is the standard unit for measure when assessing the size and impact of DERs. |
| Load | Coincidental electrical load, most often measured in MWs. |
| Loading order | The order in which energy resources are utilized by the grid. Established in 2003 by the state's principal energy agencies, California's preferred loading order is energy efficiency, demand response, renewables, and distributed generation. |
| LoadSEER | Distribution planning platform. A customized system that integrates demand side approaches into utility planning, together with Integral Analytics (creator of LoadSEER). Integral Analytics is owned by Willdan Group, Inc. http://www.integralanalytics.com |
| MW | Megawatt. 1,000,000 watts; MW is the standard unit of measure for describing feeder capacity |

Some embodiments include a system that allows for large-scale, and efficient analytics of a utility's electrical assets. In some embodiments, the user can comprise a wide variety of organizations, including both owners of the assets (traditionally a utility), regulators, or other interveners in the asset panning and utilization processes. In some embodiments, the system can comprise a single interactive platform that can provide utilities or other users with high level summaries as well as "deep dive" information on specific assets, such as a sub-station bank, distribution feeders, DERs (distributed energy resources), and other electric assets. Throughout, users will be defined as utilities (i.e., a user can be a utility), however in at least some embodiments of the invention disclosed herein, users can include entities other than utilities and/or can be utilities and entities other than utilities.

Some embodiments include a point and click user interface that provides distribution planners with easy access to detailed data, high powered analytics, and a comprehensive optimization engine which identifies opportunities to defer or eliminate asset replacement through the recommendation of a feasible local portfolio of the most cost effective distributed energy resource products and programs. In some embodiments, this front end can be prototyped in Tableau®, and can be expanded into a web-hosted interface with the ability to scale to more features in production. Tableau® is a registered trademark of Tableau Software, Inc.

Some embodiments of the invention include a system that can collect disparate datasets including: asset information, load and DER forecasts, technology impact curves, customer insights, smart meter usage data, and more. For example, in some embodiments of the invention, one or more systems and/or methods described herein can utilize load, interval and other sources of data to identify strategic customers and target demand reduction in local areas by combining and integrating multiple DER technologies (e.g., energy efficiency (EE), demand response (DR), distributed energy storage, and distributed photovoltaics (PV)). In some embodiments, this can enable a utility to estimate a sufficient amount of demand reduction, give visibility into the customer-side resources and improve the reliability of customer-side resources at the local level in order to delay or completely eliminate the need for local capacity expansion expenditures. At full scale deployment, in some embodiments, the tools and functionalities of the system can analyze an entire electrical grid to proactively identify and solve potential future capacity overload scenarios or use DERs to avoid the operation or construction of expensive and greenhouse gas emitting "peaker" power plants or similar power plants needed for local reliability. In some embodiments, business process time can be reduced by more than 99.99%, saving thousands of hours and enabling more in-depth analysis and exploration. In some embodiments, this can be achieved through the use of distributed computing and open source languages and frameworks.

In some embodiments of the invention, the system can comprise a TDSM (targeted demand-side solution) optimization platform that collects disparate data from across the company including: asset information, load and DER forecasts, technology impact curves, customer insights, smart meter usage data, and more. In some embodiment disparate data includes historical and forecast energy usage, historical and forecast weather patterns, and historical and forecast population models from within or outside the utility company. Further, in some embodiments, the system can optimize by solving independent mixed-integer linear programs in parallel using cloud computing resources. In some embodiments, these optimizations can solve for the lowest cost DER and/or wires portfolio that can mitigate a forecasted upgrade constrained by local DER adoption potential. In some embodiments, the system can recommend specific customers to target when implementing the DER solution. In some embodiments, these customers are the most likely to adopt the selected portfolio of DER technologies based on propensity models.

In some embodiments, the system can optimize by solving independent mixed-integer linear programs in parallel with computing resources that comprise a plurality of virtual or physical processor cores. In some embodiments, these optimizations can solve for the lowest cost DER and/or wires portfolio that can mitigate a forecasted upgrade constrained by local DER adoption potential.

Some embodiments include recommendations for specific customers to target when implementing the DER solution. In some embodiments, these customers are the most likely to adopt the selected portfolio of DER technologies based on advanced propensity models.

Some embodiments include a system that enhances a utility's current internal capabilities by building a modular, scalable TDSM platform that enables rapid and replicable analytics.

Some embodiments of the system include a tool that leverages customer level demographic, usage, and propensity-to-adopt-DER data along with grid information and forecasts to create a robust optimization engine for identification of the lowest cost solution capable of deferring, or completely mitigating, the need for an asset upgrade. Because of this high-resolution customer data, in some embodiments the system is quite unique in its ability to model hyper-local DER potential and customer adoption probability.

In some embodiments, the system can include a user interface that has a live connection to the cloud-based optimization engine, allowing utilities to "deep dive" into the data and analytics that underlie the optimal solution, as well as to explore various sensitivity analyses, including, but not limited to: where distribution asset overloads will occur and/or when these overloads will occur; what solution and/or portfolio of solutions can meet the need; which solution is the lowest cost option; and/or which customers are most likely to adopt DERs and are thus good candidates for targeting.

In some embodiments of the invention, the system can enable distribution planners to have immediate access to the information needed to understand the feasibility of TDSM solutions to mitigate forecasted asset overloads. FIG. 1 shows a screenshot of the optimization overview tab of the system user interface in accordance with some embodiments of the invention. Further details of the optimization model and this user interface is described below.

In some embodiments, for each asset (e.g., such as one of 476 feeders in the system pilot area), a data engineering portion of the model can setup the input data for the optimizations according to (i) to (v) below:

(i). Which customers on the asset are matched (likely to adopt and eligible for) to each DER product/program. This is the DER potential available on the asset for use in NWA solutions, in the pilot embodiment of the system this ranges from 76-125 different DER options per asset, depending on the asset's customer base.

(ii). The levelized cost associated with each DER product/program.

(iii). The levelized cost and incremental size of wires alternatives (grid upgrades). The incremental size (in MW) and cost of grid upgrades is a utility input to the model (defaults to 10 MW and $100/kW per year).

(iv). Hourly DER impact shapes associated with eligible DER products/programs on the asset (based on which customers on the asset are matched with which DER in #1. above). This is the potential impact a DER could have on mitigating asset overload.

(v). Hourly load forecasts and asset capacities. This identifies asset overloads where they occur, including a utility-specified resource adequacy buffer (defaults to 5%).

In some embodiments, the system optimization process can identify the lowest cost portfolio of DER and wires options available to mitigate forecasted asset overloads subject to the following two constraints:

(1). The DER products selected by the optimization must not exceed the available DER potential on the asset.

(2). Asset overloads must be mitigated in every hour of the year.

In some embodiments, mitigating asset overloads also means that DERs that can cause load increases in some hours (such as storage and DR) cannot cause any hour of the year to become overloaded. In some embodiments, a utility-specified resource adequacy buffer, also referred to as an overload scale factor, alters the asset capacity (e.g., feeder) in the optimization model to experience slightly more overloads so that the optimal solution builds in some buffer to minimize the risk and to account for potential forecast inaccuracies. In some embodiments, the overload scale factor increased the probability of getting enough matched customers who are willing to adopt DERs (i.e., the buffer finds more potential customer matches than what is needed at a maximum asset capacity, the degree to how many more is controlled by how much the user discounts the capacity).

In some embodiments of the invention, the resulting optimal solution can be DER only, DER+wires, or wires (i.e., grid upgrades) only.

In some embodiments of the invention, assets are solved independently and/or in parallel using Python® and Apache Spark® on Amazon Web Services® ("AWS®"), a suite of back-end storage, elastic compute, and data preparation tools. Apache® and Spark® are registered trademarks of the Apache Software Foundation, and Amazon Web Services® as well as AWS® are the registered trademark of Amazon, Inc. Python® is a trademark or registered trademark of the Python Software Foundation. In some embodiments, AWS® provides secure, on-demand, distributed cloud computing services which allow utilities to easily scale resources, such as the number of processor cores, for example, up or down to meet user needs as they evolve.

In some embodiments, each year is solved in series for a specific asset, taking into account any previous years' solutions (e.g., any DER product load impacts associated with previous solutions are subtracted from the following years' load forecasts before going into the next optimization.)

In some embodiments, the mathematical formulation for the optimization objective function and constraints is given in Equation 3 shown below. In some embodiments, the optimization problem is solved using the CBC (coin-or branch and cut) open source mixed-integer linear programming solver.

In some embodiments, the system can enhance a utility's current internal capabilities by building a modular, scalable TDSM platform that enables rapid and replicable analytics. In some embodiments, the system platform described herein overcomes many of the limitations of prior TDSM support tools by providing utilities with orders-of-magnitude advancements in data granularity, robustness, capabilities, and flexibility of use. In some embodiments, the system platform can handle hourly interval data for millions of electrical accounts, customer demographic information, hourly impact curves for DER products and programs, and load forecasts for all distribution assets in a territory. In some embodiments, unique load curves for storage dispatches and for different PV system sizes can depend on a customer's usage and/or forecasted system, and can reach many thousands of distinct load impact curves.

In some embodiments of the invention, the system can increase affordability and grid reliability by enabling better identification, quantification, and implementation of opportunities to defer electric asset capacity upgrades with NWAs. In some embodiments, proactively identifying these instances allows the utility to complete planned upgrades on a non-emergency basis, which lowers costs and can be scheduled to minimize outage impacts.

Some embodiments of the invention include a system comprising a data analytics platform capable of collecting, combining, and analyzing data from a variety of data sources, including, but not limited to, customer usage, customer demographics, distribution asset forecasts, DER adoption forecasts, DER impact shapes, and various other data from utility data "silos." Some embodiments include using this data, system implementing an optimization algorithm that identifies the lowest cost portfolio of NWAs and/or wires solution that mitigates the forecasted overload for the distribution asset under consideration. In some embodiments, the variables considered can include, but not be limited to, asset capacity, and/or forecasted load, and/or calculated magnitude of capacity deficiencies, and/or timing of capacity deficiencies, and/or the potential of each DER in the asset geography, and/or the load impact curve for each DER, and/or DER and wires levelized costs.

In some embodiments, by recommending specific DER technologies to individual customers, the system can help ensure the achievability of the lowest cost portfolio. In some embodiments, these recommendations are informed by customer demographics and include a suite of DER technologies including energy efficiency (EE), demand response (DR), distributed PV (DG), and energy storage (ES). In some embodiments, the system can enable utilities to rank and compare cost optimized recommendation portfolios across the electric grid under consideration.

In some embodiments, the system code is modular, where both data and code blocks can be easily exchanged or modified without disrupting the larger solution. The input data and code for system can be well documented, and this documentation can be centralized on an accessible and navigable webpage. All code generated in some embodiments is version controlled with GitHub®, GitHub® is an exclusive trademark registered in the United States by GitHub, Inc.

Figure 2:
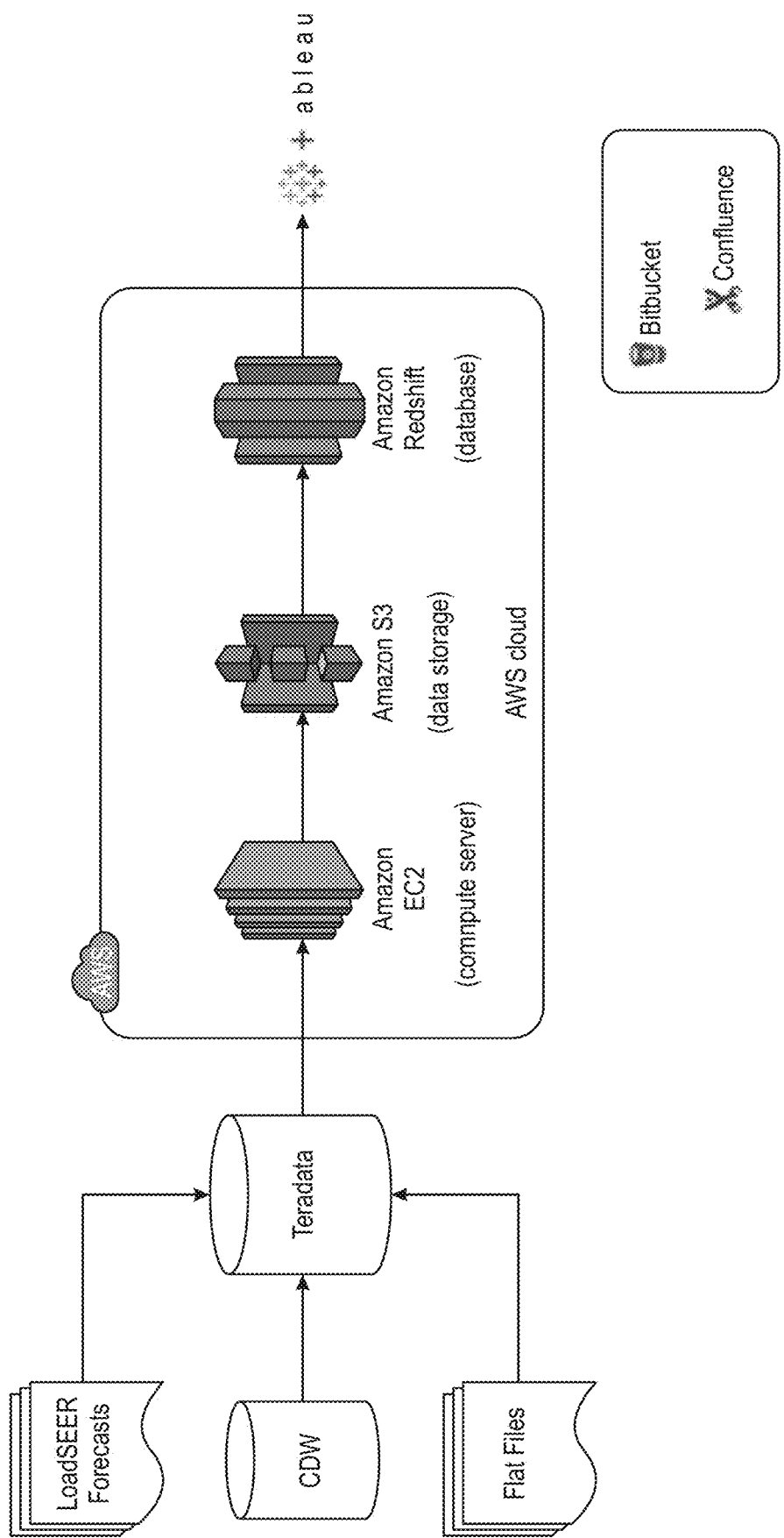
FIG. 2 shows an overview of platforms used in the system in accordance with some embodiments of the invention.

FIG. 2 shows an overview of data analytics platforms and data collection and processing portions used in the system in accordance with some embodiments of the invention. In some embodiments, the system can automate assessment of assets for NWA (non-wires alternative) and DER (distributed energy resources) targeting. In some embodiments, previous NWA assessment techniques could require 180 man-hours per asset to complete. In some embodiments, NWA assessment processing according to the present disclosure can take approximately 10 minutes per asset, representing a more than a 99.9% reduction in process time. In some embodiments, the assets include feeders. In some embodiments, a feeder is a voltage power line (i.e., a wire) transferring electrical power from a distribution substation to a distribution transformer. In some embodiments, the results of the optimization can be used to recommend specific technology products and/or programs to specific customers. In some embodiments, this makes implementing the NWA solution easier and more likely to be successful. In some embodiments, the system can produce data with NWA data that is more granular, centralized, and has improved documentation, and the system can increase the granularity the modeled load curves and DER technologies. For example, while the previous TDSM process techniques used as few as eight load curves to represent all DER technologies, in some embodiments the present system can evaluate hourly load impact curves (e.g., 8760 hours per year) for each DER individually.

In some embodiments, the system can enable distribution asset load shapes that have been improved from weekday versus weekend with occasional seasonal variation to unique curves for each month (576 data points per year); In some embodiments, this improves the process by making the NWA data more granular, where results are based on inputs from more data points than would be practical with conventional methods.

In some embodiments, the system can also use custom rooftop solar system sizes and energy storage dispatch profiles for each customer based on their individual load.

In some embodiments, the system can improve data quality and centralize all the data required for NWA analyses into a data lake in the cloud. In some embodiments, this data centralization in the computing cloud network makes it easier to access the data, to examine data quality, or make methodological updates. Further, as the data inputs improve, the outputs of system will similarly improve.

In some embodiments, the system is built with several cloud based computer services. In some embodiments, the cloud based computer services include Amazon Web Service (AWS®) products that allow for full scale deployment of the present system for all individual assets and whose computing resources can easily be scaled up or down on a moment's notice. Some embodiments include an on-demand cloud computing environment.

In some embodiments, in order to resolve DER cost calculation inconsistencies, a levelized cost of energy approach was developed and utilized to translate DER costs and asset life lengths into comparable metrics. As a result of bringing together DER impact curves into a single format and database location, a utility can be presented with a more consistent and accessible set of DER impact curves for use in modeling.

In some embodiments, the system can utilize a multi-billion record collection of data comprising of electric customer usage intervals, demographic information, customer-level DER adoption propensities, hourly asset load forecasts, and hundreds of unique DER impact curves. This record count does not include individual customer solar generation and energy storage dispatch curves.

In some embodiments of the invention, the system can identify the most cost-effective alternative for mitigating a forecasted asset overload. This solution can be wires only, wires+NWA, or NWA only. In some embodiments, each year of an overloaded asset is optimized serially, so the optimal solution for an asset over time may be some combination of these options. For example, in some embodiments, an asset with a steadily increasing overload may produce an optimal solution that uses NWA in the early years and a wires upgrade in later years. In some embodiments, a NWA portfolio must meet two sets of constraints to be a viable solution to an overload:

(1) The NWAs must have appropriate timing, magnitude, and duration to alleviate all asset overloads (including a resource adequacy buffer); and (2) Enough customers on the affected asset must be available and eligible to adopt the NWA portfolio's DER products and programs.

In some embodiments, the results of system are presented to the utility in Tableau® via a live connection to the data in AWS® for visualization and communication. In some embodiments, this front-end dashboard can allow utilities to access several asset forecast scenarios, and/or modify the view range from a single hour, to as many as 8 years. In some embodiments, this front-end dashboard can allow utilities to identify assets with expected overloads, and/or see the load impact of the optimal mitigation solution (NWA and/or wires), and/or modify the resource adequacy buffer, and/or explore the individual load profiles of every product or program in the NWA solution. In some embodiments, this front-end dashboard can allow utilities to identify specific customers to target for DER adoption, and/or provide modularity and optionality when meeting distribution needs compared against the 50+ year asset life of a traditional wires upgrade.

In some embodiments, primary data collection and engineering can utilize a Teradata® database, an interval data warehouse and a SQL platform. Teradata® is trademark or registered trademark of Teradata Corporation. In some embodiments, the data can be stored and further processed in AWS®. In some embodiments, model results can be reported in a user interface developed in Tableau®, which accesses AWS® via a live data pipeline. FIG. 2 shows a high-level overview of the system computing architecture utilized in some embodiments of the invention.

Some embodiments use BitBucket®, a proprietary version of the ubiquitous GitHub® version control hosting service, on an internal server for code review and version control; in some embodiments, an internal Confluence® wiki site can be used for ongoing documentation and communication with stakeholders. BitBucket® and Confluence® are trademarks or registered trademarks of Atlassian.

Figure 3:
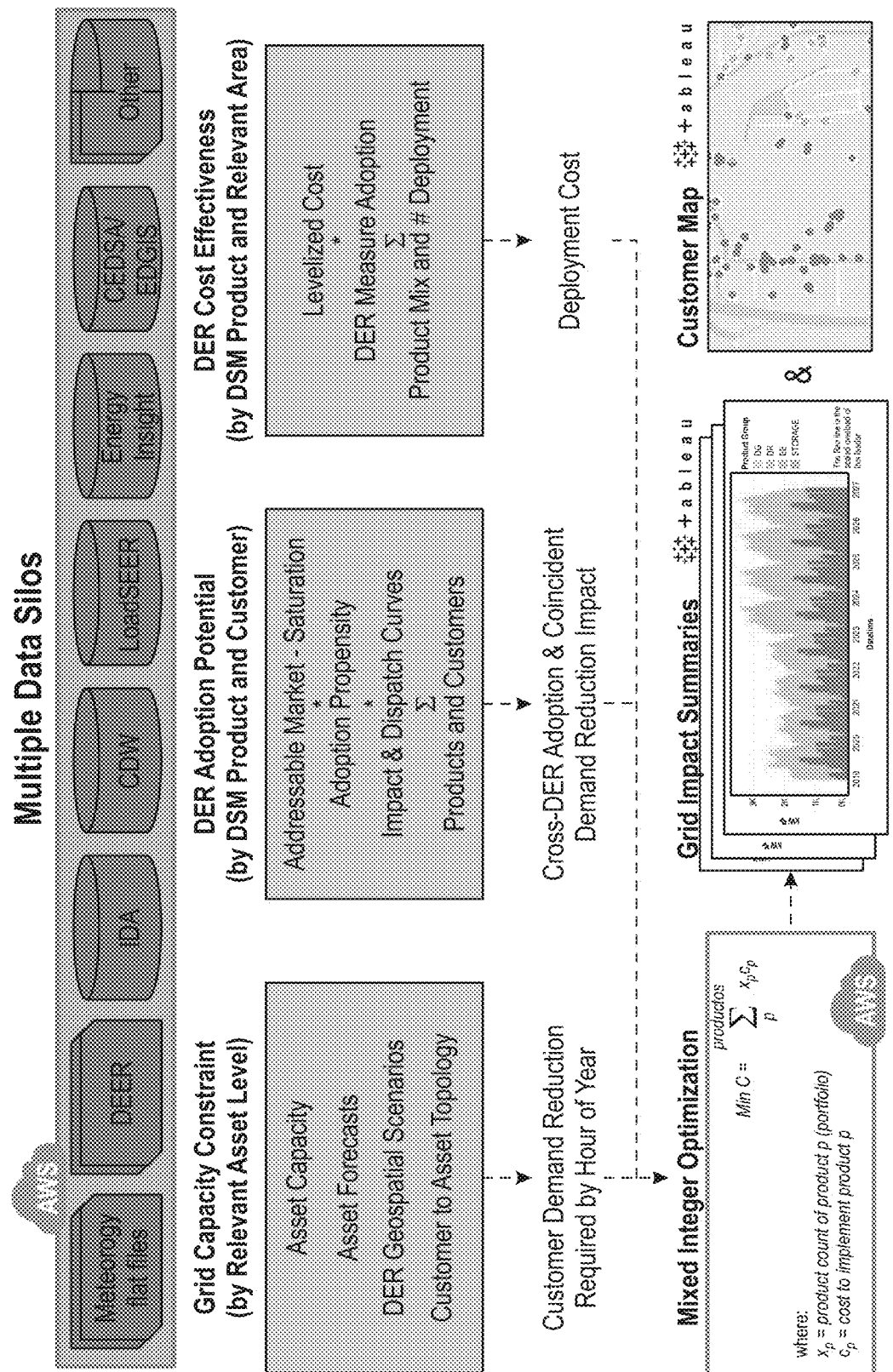
FIG. 3 illustrates a data and analytics flow in accordance with some embodiments of the invention.

As described previously, FIG. 1 shows a screenshot of the optimization overview tab of the system user interface in accordance with some embodiments of the invention. The system optimization model is comprised of the following steps, summarized in FIG. 3. In some embodiments, the system can use the following key data pieces:

i). Grid data, including asset level load and "organic adoption" DER forecasts;

ii). DER adoption potential by customer (based on exogenous propensity models);

iii). DER impact shapes by customer; and/or iv). Levelized costs of DER and wires alternatives.

In some embodiments, data engineering can occur in Teradata® and on AWS®, and can include:

i). Pre-dispatch DR for DR eligible customers based on forecasted asset level load peak days and DR program operational characteristics;

ii). Pre-dispatch storage for storage eligible customers based on minimizing individual customer bills;

iii). Determining available DER product/program customer matches on each circuit/asset and their associated implementation costs;

iv). Constructing hourly 8760 impact shapes for each DER and year on an asset; and/or v). Assembling each asset's forecasted 8760 load profile, with ability to adjust for expected "organic" DER adoption scenarios. For example, in some embodiments, there are different load forecasts used in distribution planning. In some embodiments, different load forecast include 1-in-10 year weather events and 1-in-2 year weather events. In some embodiments, all these risk scenarios can be accommodated by the system, with the flexibility to use any number of load forecast scenarios for a given asset.

In some embodiments, the optimization engine can execute one or more of the following steps for an asset optimization:

i). Run optimization for each asset for the current year, which returns optimal portfolio for each asset for the current year; (Note: in the system's pilot Year 1 is 2019)

ii). Subtract the current year optimal portfolio from the asset load profile (e.g., assume the current year optimal portfolio is achieved). Run each asset optimization for the next year;

iii). Repeat for all years where an asset optimization is desired.

iv). Identify individual customer targets based on DER propensity scores and/or dispatching.

v.) Triangulate optimal portfolio with ranked propensity scored customers for each DER product/program; and/or vi). Prepare results for the data visualization software front end.

In some embodiments, the optimization engine is executed by AWS®. In some embodiments, multiple assets optimizations are run in parallel utilizing Apache Spark® on AWS®. In some embodiments, data visualization is achieved with data visualization software. In some embodiments, the data visualization software is Tableau®.

In some embodiments, the system can use equipment data to evaluate the potential for overload on each asset. In some embodiments, this data can include grid topology (mapping from customer to feeder to bank); seasonal asset capacities; and asset level representative hour forecasts (e.g., 576 hrs/yr; 24 h each for 'typical' weekdays and weekends in each month). In some embodiments, this data is processed using LoadSEER, a distribution planning platform developed by Integral Analytics, Inc. In some embodiments, enhancements to LoadSEER add the "organic" DER adoption forecasts for each asset and the system draws upon the work done previously to enhance LoadSEER with organic DER scenarios as inputs.

In some embodiments, customer data is used in the propensity models described herein to identify which customers are eligible and/or likely to adopt DERs, and therefore how much potential for DERs is available for an asset under consideration. In some embodiments, this data includes customer demographics, rate schedules, locations, business types, DER adoption history, and electric usage. In some embodiments, previously developed propensity models using the aforementioned data are used by the present system. Some embodiments of the system assembles the results of previously developed propensity models (i.e., previous DER adoption propensity scores) from several of the utility company's internal data warehouses.

In some embodiments, levelized costs represent the net present value for a product or measure over the lifetime of the products savings. In some embodiments, levelized costs are effectively a proxy for the average price that one would pay over the product or measure's lifetime. For example, in some embodiments, the utility may pay a rebate in year 1 to a customer who installed an EE (energy efficient) product, but that product may provide savings for 10 years. In some embodiments, since all costs are incurred in the first year, the savings must be discounted over the expected useful life (EUL) of the product. Conceptually, discounting the savings over the EUL is effectively evaluating how much savings would occur had the future value of first year costs been applied in each subsequent year according to some embodiments. In some embodiments, the general form for of this discounting is described with Equation 1.

The cost-effectiveness of DERs has historically been evaluated using the metric appropriate for the application, such as the "Societal Cost Test" (SCT), "Total Resource Cost" (TRC), and "Program Administrator Cost" (PAC). In some embodiments, the DER and the traditional wires alternative costs need to be calculated using the same metric to enable an apples-to-apples comparison. In some embodiments, the system calculates the levelized cost using the PAC, since this represents the cost to the utility for the resource.

Equation 1: Levelized Cost (LC) Calculation:

$$LC = \text{Levelized KWh Costs} = \frac{PAC \text{ Electric Costs}}{\text{Discounted KWh Savings}}$$

Where discounted savings is computed using a standard annuity formulation, see Equation 2:

Equation 2: Discount Rate Calculation $$\text{Discounted KWh savings} = \text{annual KWh savings} * \frac{\left(1 - \frac{1}{(1 + \text{discount rate})^{EUL}}\right)}{\text{discount rate}}$$

In some embodiments, the inputs for the levelized cost calculation come from a variety of sources, including market monitoring reports, public filings, and utility employed subject matter experts (SME).

Figure 4:
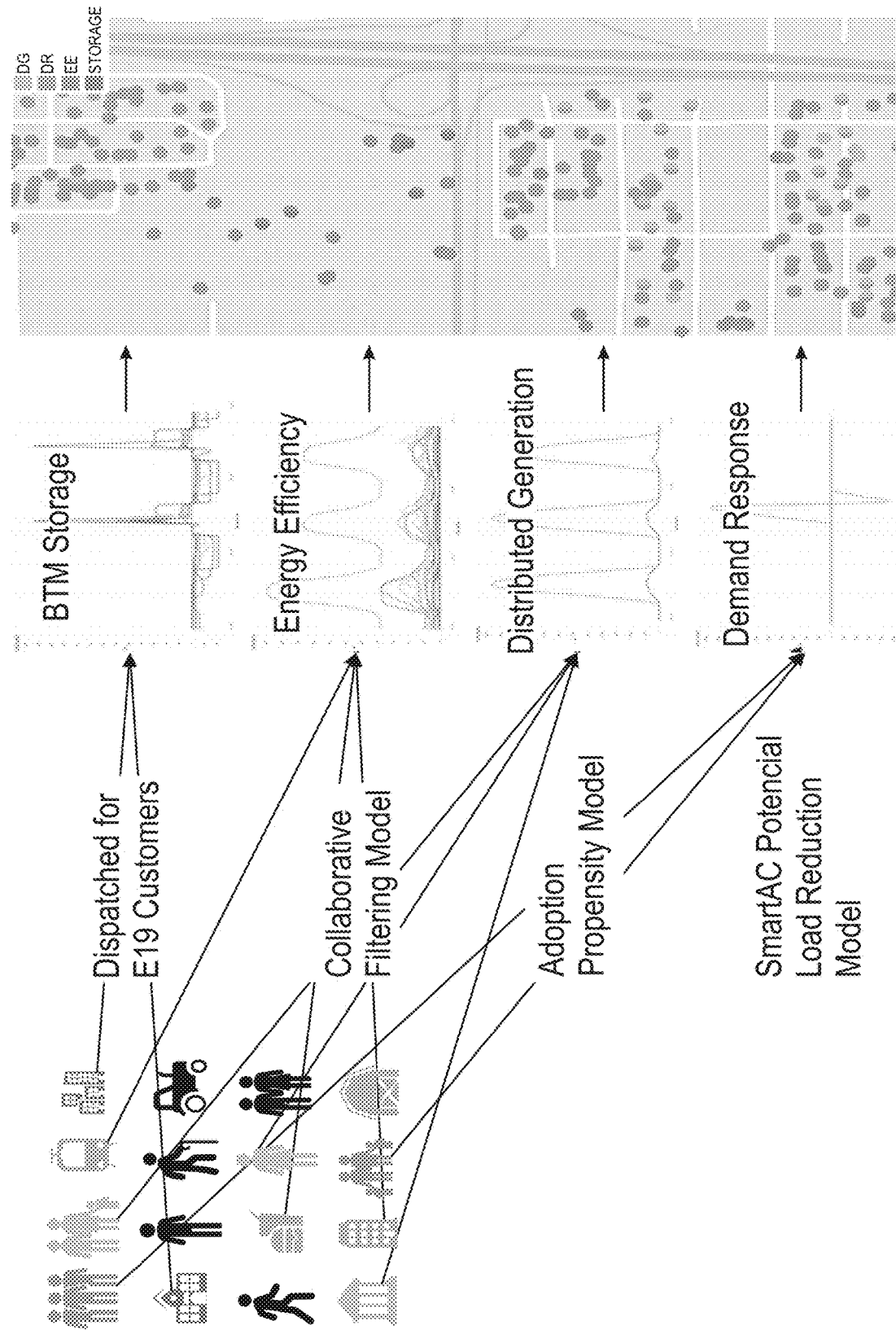
FIG. 4 shows a demonstration of the impact of propensity models customer to impact shape matching in accordance with some embodiments of the invention.

In some embodiments, the system constrains the optimization model such that it can only recommend NWA where there is verified potential for such technologies to exist on the circuit. In some embodiments, this adoption potential is calculated on a customer by customer basis for each DER separately using propensity models that already existed prior to system development. These models are visualized in FIG. 4, showing the demonstration of the impact of propensity models customer to impact shape matching according to some embodiments. In some embodiments, the system uses customer-level propensity models, and is therefore able to identify and analyze the potential for individual customers to adopt specific DERs to make up a NWA DER portfolio. In some embodiments, these can allow the system to individually match DER technologies to good candidates for adoption.

Figure 5:
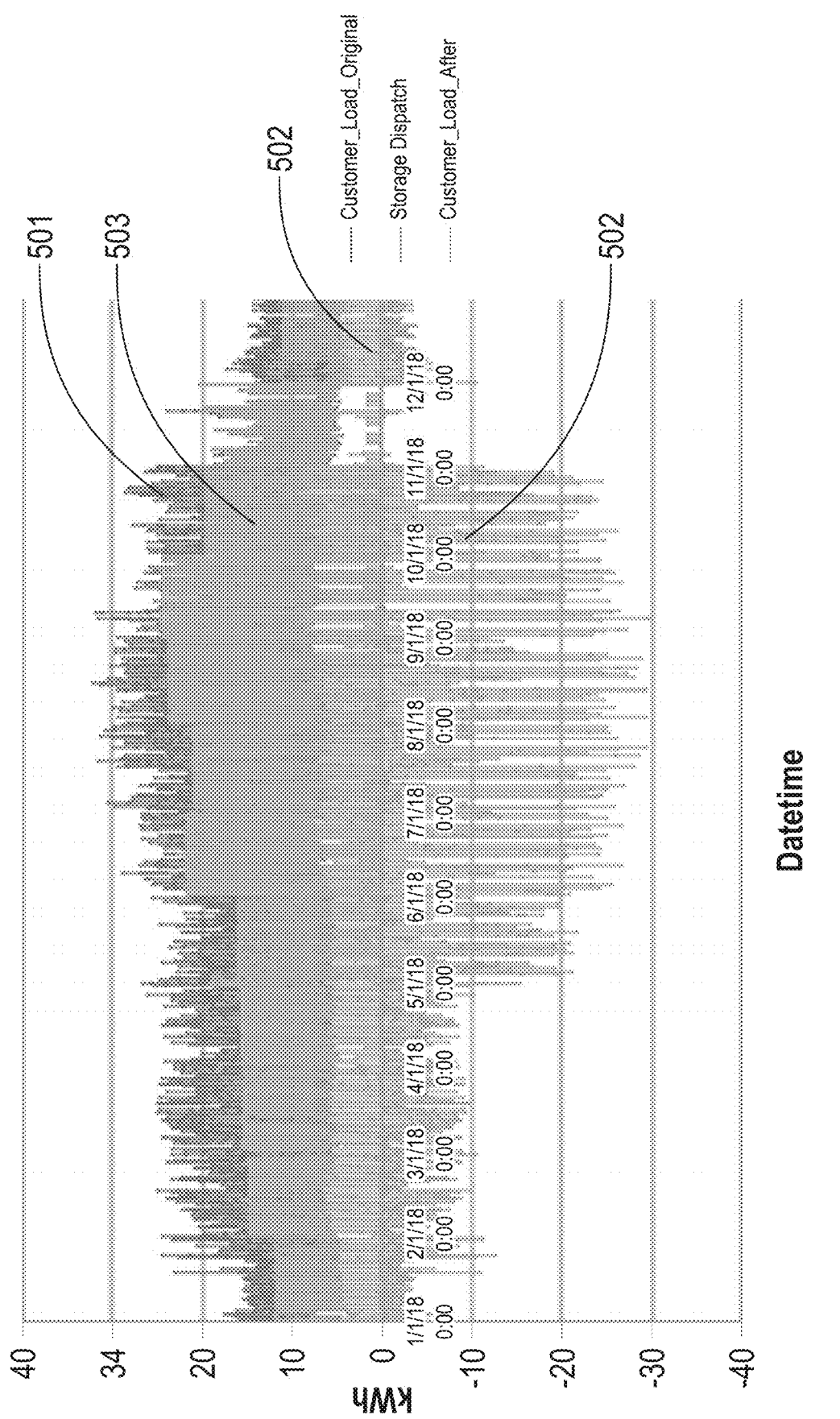
FIG. 5 shows an example optimal storage dispatch for a customer in accordance with some embodiments of the invention.

With regard to BTM (behind the meter) storage, in some embodiments, the system can calculate the optimal storage dispatch profile for storage-eligible customers based on an individual customer's 8760 load profile using a storage dispatch optimization tool, as visualized in FIG. 5. This tool calculates the optimal dispatch of a storage system such that it minimizes each customer's bill ("customer control"). Other embodiments of the system tool may incorporate the option to optimize dispatch under a "utility control" regime which focus on the most efficient use of all assets, rather than a regime which focuses on achieving a lower bill for the customer.

FIG. 5 shows an example of the results of the storage dispatch tool according to some embodiments. The original customer load is marked as 501, the optimal storage charging and dispatch is 502, and the resulting customer load is 503. In some embodiments, the optimal storage dispatch profiles are inputs to the asset DER portfolio optimizations as the impact curves for specific customers if they adopt storage (i.e. the storage is pre-dispatched). For some embodiments, there are not yet enough existing storage adopters to properly train a true propensity model for storage, and there is not yet a good definition of adoption potential for storage customers. So, each storage dispatch impact curve is matched to exactly one potential storage customer, and considered as independent DER products in the asset level portfolio optimizations. In some embodiments, if a specific storage dispatch customer match is chosen as part of the optimal portfolio, then this customer is automatically a target (i.e., there is no propensity ranking for storage customers as their associated impact curves are unique). In some embodiments, levelized cost for BTM storage is adopted directly from a cost of storage market assessment (e.g., such as from Lazard Ltd.).

In some embodiments, EE (energy efficiency) product groups (made up of many EE measures) and customer-specific EE product matches use a knowledge-based recommendation engine which uses association rule learning to identify EE program adoption patterns. In some embodiments, this model discovers characteristics common to customers who adopt the same EE product groups, and then recommend that product to customers with similar characteristics who have not yet adopted the measure. In some embodiments, this system effectively forecast the adoption potential for EE product groups. In some embodiments, there can be many customers matched to the same EE product by this model, and each customer can be matched to multiple EE products. In some embodiments, to rank these customer targets, the system ranks the customers based on their average total monthly energy usage for the past year (high consumers being better targets). In some embodiments, as customer level EE propensity models are developed at the utility, the propensity models can easily replace this ranking system.

In some embodiments, levelized costs for EE use the formulation in Equation 1, where the electric costs and the amount of KWh (kilowatt hour) savings are outputs of the cost effectiveness tool (CET). In some embodiments, the costs and savings are based on annual CET results, and are assumed to be constant into the future.

Some embodiments include utility developed propensity-to-adopt scores for customer PV (photovoltaics) adoption using logistic regression models for residential and non-residential customers. In some embodiments, customers in single family, owner-occupied homes with above-average electricity usage and neighbors who have already adopted PV are the most likely to adopt PV in the future, and non-residential PV adoption is more likely among large customers with relatively high usage. In some embodiments, PV system sizes are customized to the individual customer based on their historic load. In some embodiments, levelized costs are provided directly from internal PV forecast models. In some embodiments, PV impact shapes can be developed for each type of PV mounting structure (flat roof, tilted roof, and ground-mount) for each distribution planning area by the utility's internal meteorology team using historic weather data and the National Renewable Energy Lab's (NREL) PVWatts tool. In some embodiments, depending upon the individual customer's forecasted system size, the PV impact shape is scaled accordingly. Thus, in some embodiments, the system considers the load impacts of potential PV adopters with different system sizes as separate products in the asset level portfolio optimizations.

In some embodiments, the system includes two DR (demand response) programs, Base Interruptible Program (BIP) and SmartAC. These are now integrated in the California ISO (CAISO market) as supply-side DR, but are still considered as DERs that affect long term distribution planning scenarios. Some embodiments can utilize a SmartAC "Potential Load Reduction Model" that can be leveraged to rank SmartAC customer targets. Some embodiments include modeling the dependency between a coefficient of variation (CV) of load and historical impacts. In some embodiments, a curve is fit to minimize the error between CV and the load impacts. Since BIP eligibility is restricted to a very few large customers, all eligible customers are considered by the optimization model as potential adopters according to some embodiments.

Similar to storage, in some embodiments, the DR load impacts can be pre-dispatched before the portfolio optimization model. For DR, in some embodiments, the dispatch is based on the load forecasts for the specific asset under consideration and the program's operational characteristics. DR is dispatched on peak days while meeting one or more program constraints.

In some embodiments, the impact curves for days when DR is dispatched are derived in accordance with the load impact protocols. In some embodiments, the load impact data uses rigorous econometric models and experimental design techniques. Official compliance filing reports documenting how the load impacts were developed for each program are publicly available. These reports provide highly detailed descriptions of how the source data was developed for each program as well as performance characteristics.

In some embodiments, for each asset in the system pilot area (e.g., 476 feeders), the data engineering portion of the model can set up the following input data for the optimizations:

a). Which customers on the asset are matched (likely to adopt and eligible for) to each DER product/program. This is the DER potential available on the asset for use in NWA solutions and ranges from 76-125 different DER options per asset, depending on the asset's customer base;

b). The levelized cost associated with each DER product/program based;

c). The levelized cost and incremental size of wires alternatives (grid upgrades). The incremental size (in MW) and cost of grid upgrades is a utility input to the model (defaults to 10 MW and $100/kW per year);

d). Hourly DER impact shapes associated with eligible DER products/programs on the asset (based on which customers on the asset are matched with which DER in 1 above). This is the potential impact a DER could have on mitigating asset overload; and e). Hourly load forecasts and asset capacities. This identifies asset overloads where they occur, including a utility-specified resource adequacy buffer (defaults to 5%).

In some embodiments, the optimization itself identifies the lowest cost portfolio of DER (distributed energy resources) and wires options (e.g., grid upgrades) available to mitigate forecasted asset overloads subject to the following two constraints:

i). The DER products selected by the optimization must not exceed the available DER adoption potential on the feeder; and ii). Asset overloads must be mitigated in every hour of the year.

In some embodiments, this also means that DERs that cause load increases in some hours (storage and DR) cannot cause any hour of the year to become overloaded. In some embodiments, the resulting optimal solution can be DER only, DER+wires, or wires only.

In some embodiments, feeders are solved independently and in parallel using Python® and Apache Spark® on AWS®. In some embodiments, each year is solved in series for a specific feeder, taking into account any previous years' solutions (e.g., any DER product load impacts associated with previous solutions are subtracted from the following years' load forecasts before going into the next optimization).

In some embodiments, the mathematical formulation for the optimization objective function and constraints can be formalized in a linear program. In some embodiments, a linear programming problem consist of an objective function (which is linear) and a system of linear inequalities referred to as constraints. In some embodiments, the objective function specifies the quantity that is to be maximized or minimized. The constraints determine the set of feasible solutions. In some embodiments, the optimization model objective function and constrained is represented by the Mixed Integer Programming (MIP) Objective Function given in Equation 3 shown below. In some embodiments, the optimization problem is solved using a mixed-integer linear programming solver. In some embodiments, the optimization problem is solved using the CBC (Coin-or Branch and Cut) open source mixed-integer linear programming solver.

Equation 3: (MIP) Objective Function
Minimize Costs:

$$\text{Min } C = \sum_{p}^{products} x_p c_p$$

where:

$x_p$=product count of product p (portfolio)

$c_p$=levelized cost to implement product p

Subject To:
Constraint on number of available products:

$$x_p \leq M_p$$

Hourly overload constraints:

$$\text{Overload}_h - \sum_p^{product} x_p l_{p,h} \leq 0$$

Mixed integer constraints:

$$x_p > 0$$

$$x_p \in \mathbb{Z}^n$$

where:

$M_p$=maximum eligible customers for that product, p

Overload$_h$=Load Foreacst$_h$–Capacity$_h$=overload in hour $h$ $l_{p,h}$=load impact of product p in hour h In some embodiments, grid/wire alternatives are treated in the same way as a DER product (there is an "incremental grid upgrade size", for example 10 MW), and a specified cost in $/kw-year, so if the optimization recommends a grid upgrade then the number of incremental upgrades required will be equal to x upgrades, where p=wires.

Figure 6:
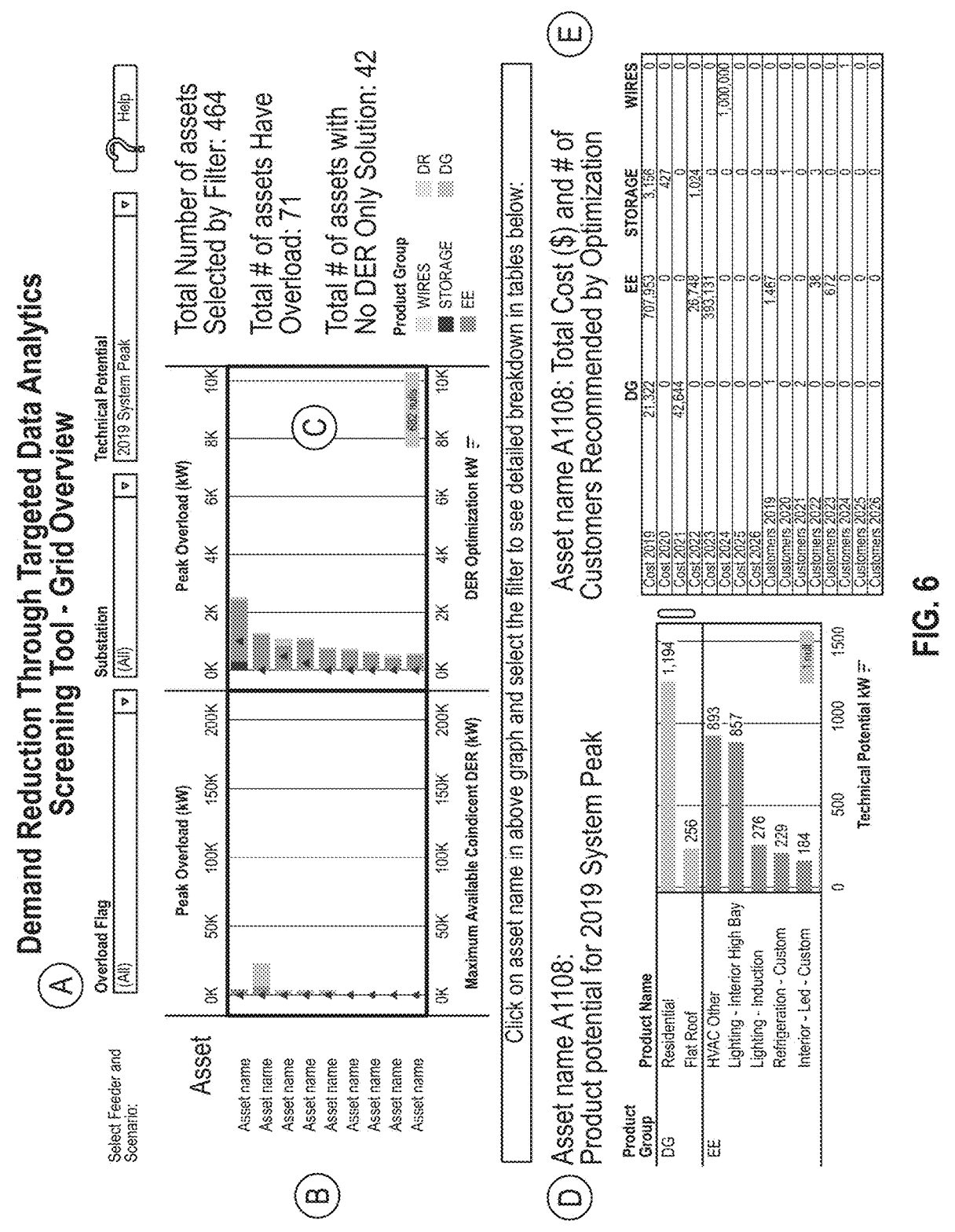

FIG. 6 illustrates a grid overview tab of the system dashboard in accordance with some embodiments of the invention. In some embodiments, the grid overview summarizes the forecasted status of the grid, expected overloads, and DER potential. Some embodiments, include drop down menus allow that allow distribution planners to filter displayed result based on overload status, grid topology, and forecast scenario, an example of which is shown in FIG. 6: A. Further, some embodiments provide a high-level summary of the state of the planned distribution grid, and shows feeders, their peak overload (red triangles), and their DER potential (colored bars), an example of which is depicted in FIG. 6: B.

In some embodiments, adoption potential is compared against the DERs selected as part of the optimal NWA portfolio (this is zero if there is no overload on the asset) as depicted in the FIG. 6: C example. In some embodiments, utilities can select a specific asset to get more detail about specific DER adoption potential on that asset, an example of which is shown in FIG. 6: D. Finally, in some embodiments, if the selected asset has an overload, the table displays the optimal mitigation portfolio (including cost and number of customers and/or wires upgrade increments) as depicted in example FIG. 6: E.

FIG. 7 illustrates an asset load overview tab of the system dashboard in accordance with some embodiments of the invention. In some embodiments, the asset load overview can help distribution planners understand the timing and magnitude of asset overloads. In some embodiments, the utility selects the asset name to analyze as depicted in example FIG. 7: A. In some embodiments, a scaled factor section allows utilities to adjust the amount of resource adequacy buffer applied to the analysis as shown in example FIG. 7: B.

In some embodiments, utilities can select from one of several pre-calculated DER adoption forecast metrics. In some embodiments, the forecast metrics come from Load-SEER. In some embodiments, these forecasts align with official submissions in the IDER (integrated distributed energy resource) and DRP (distributed resource plan) proceedings. In some embodiments, the table shows forecasted asset peak overloads by month and year, as shown in FIG. 7: D. In some embodiments, a heatmap displays forecasted overloads by day and hour for a selected year as shown in Fig. E (larger overloads are a deeper red in this non-limiting embodiment). In some embodiments, the asset analyzed in FIG. 7 has its highest overloads in the evening in the fall. In some embodiments, the striations are due to differences in weekday and weekend load forecasts. Those of ordinary skill would understand that the information in FIG. 7 can be conveyed in various ways without departing from the scope of the disclosure.

Figure 8:
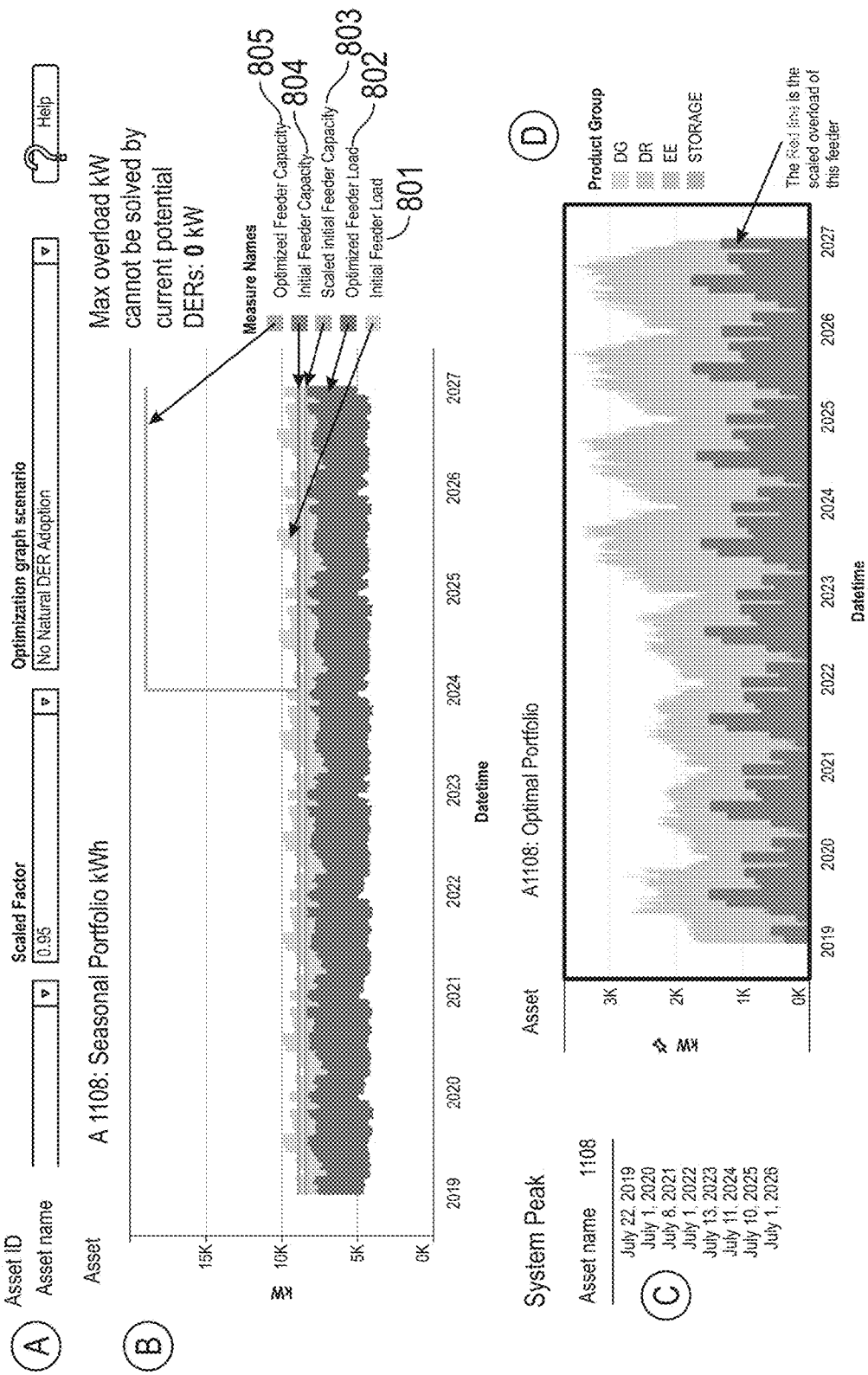
FIG. 8 illustrates an asset optimization results exploration tab of the system dashboard in accordance with some embodiments of the invention.

In reference to the asset optimization results exploration page shown in exemplary embodiment FIG. 8, in some embodiments, the system can let utilities explore the optimization results more deeply, and utilities can select the same feeder-scaling factor-forecast scenarios "A" that are available in FIG. 7: A, B, and C. In some embodiments, including FIG. 8: B, utilities can see the asset's forecasted load curve (FIG. 8: B—801), and the load curve after the optimal NWA portfolio is adopted (FIG. 8: B—802). In some embodiments, this is compared against the asset capacity (FIG. 8: B—803) and the buffer capacity (FIG. 8: B—804). In some embodiments, if a wires upgrade is the most cost-effective solution, a line will appear (FIG. 8: B—805). In some embodiments, wires solutions can be adopted in any year, depending on if and when they are the most cost effective. In some embodiments, the assets peak days are provided as reference points as shown in exemplary FIG. 8: C. In some embodiments, the load profile of the optimal NWA portfolio (difference between the light blue and dark blue lines in FIG. 8) is broken down by DER (distributed energy resource) technology. In some embodiments, a line shows a scaled overload of an asset as well as when overloads are occurring and at what magnitude as exemplified in FIG. 8: D (marked with arrow).

Figure 9:
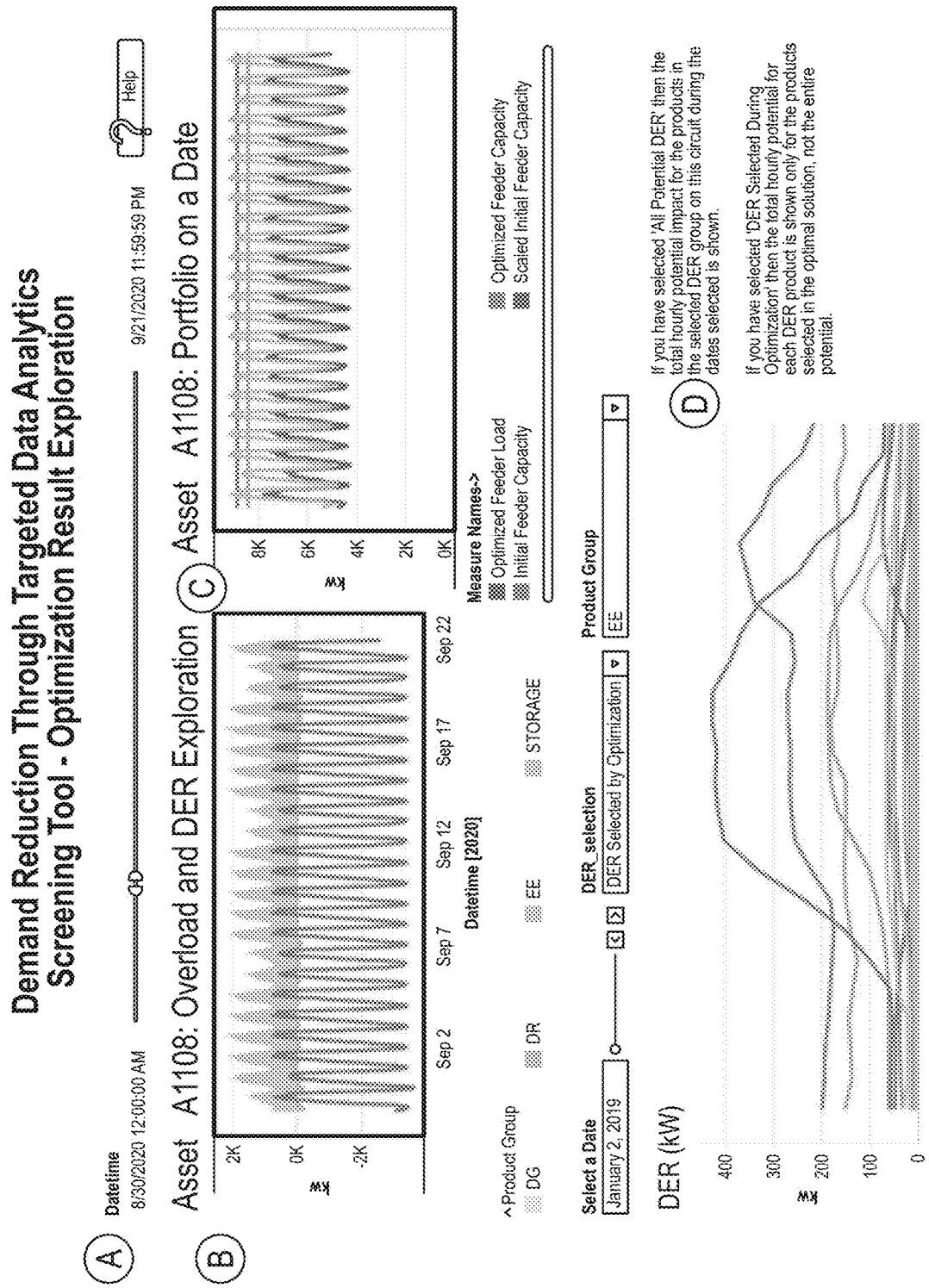
FIG. 9 shows a system optimization exploration tab of the system dashboard in accordance with some embodiments of the invention.

In some non-limiting embodiments, an asset optimization results details page (FIG. 9) can enable utilities to dive deeper into the DERs selected as part of the NWA solution. In some embodiments, utilities can select a specific time period as shown in FIG. 9: A. For example, some embodiments the specific time period ranges from one day to eight years. In some embodiments, FIG. 9: B is a zoomed in version of FIG. 8: D. In some embodiments, for the selected date range, the impact curves of the optimal DER portfolio shown if FIG. 9: C can be layered with the initial asset overload profile (FIG. 9: B—red line) (i.e. the asset's initial capacity is at zero). Further, FIG. 9: C shows a zoomed-in version of FIG. 8: B, according to some embodiments. For the selected date range, according to some embodiments, the asset load, optimized asset capacity, initial asset capacity, and scaled initial asset capacity are displayed with a resource adequacy buffer incorporated as depicted in FIG. 9: C. In some embodiments, DER impact profiles aggregated by individual DER product/program are displayed, for example, as shown in FIG. 9: D. In some embodiments, there is a tool tip that labels each line when a user's cursor hovers over one or more of the afore mentioned graphs.

Figure 10:
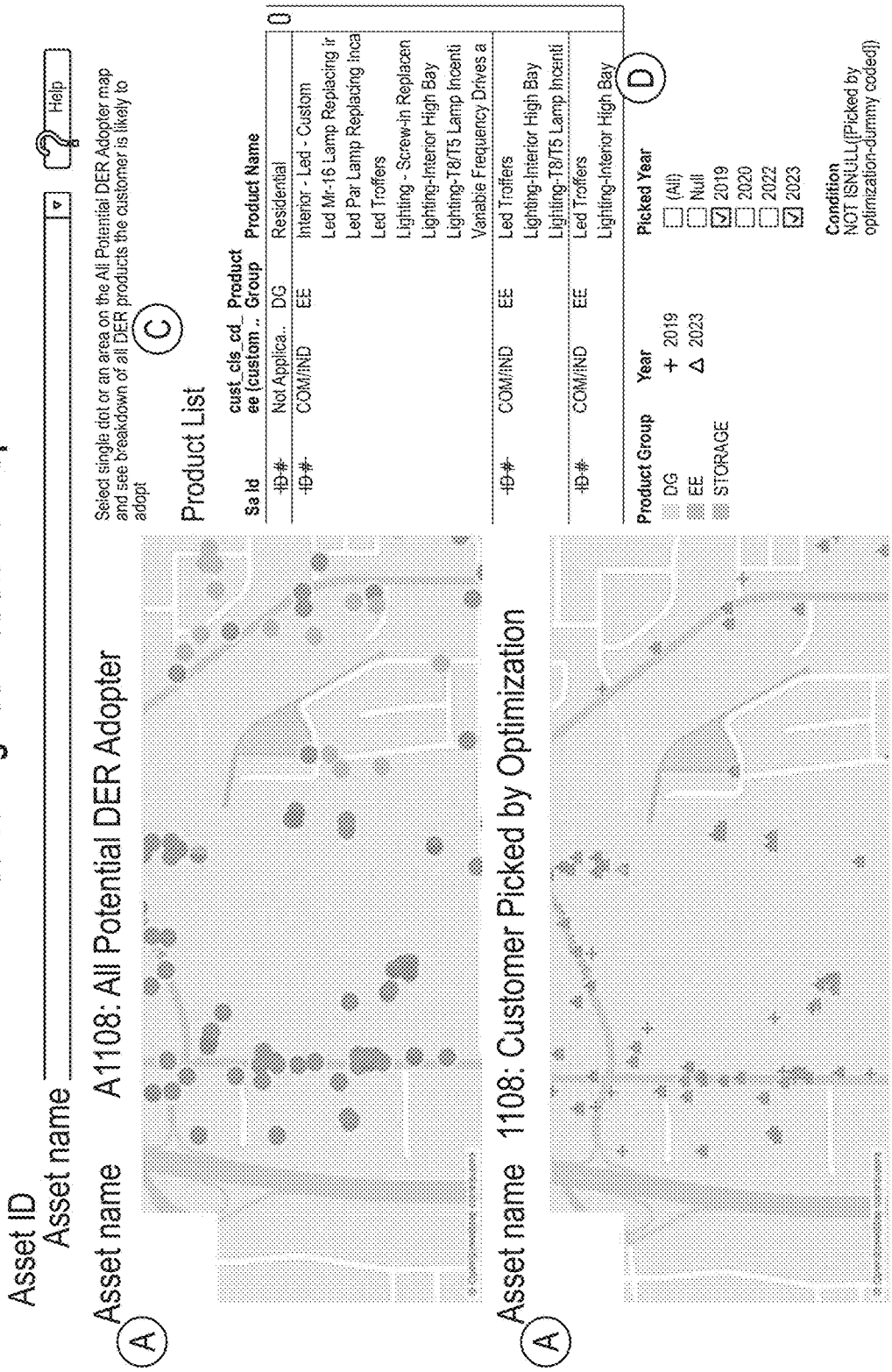
FIG. 10 shows a customer map tab of the system dashboard in accordance with some embodiments of the invention.

In some embodiments, the customer map page can allow users to identify specific customers to target for DER adoption as shown in FIG. 10. For example, FIG. 10: A is an interactive map that shows the exact location of customers who are included in the DER adoption potential on the asset according to some embodiments. In some embodiments, customers are color-coded by DER technology. In some embodiments, one or more customers can adopt multiple technologies. Further, FIG. 10: B shows a similar interface as FIG. 10: A, where in some embodiments customers who have been selected for DER adoption as part of the optimal NWA solution are shown, as well as which DER they should adopt in which year in order to achieve the optimal solution. Further, as shown in FIG. 10: C, when a specific customer is selected on a particular interface, that customer's DER adoption potential is broken down by product according to some embodiments. Further, utilities can filter the maps by DER type and year to drill down on the optimal adoption targets in some embodiments as shown in FIG. 10: D.

In an example experimental embodiment, 476 feeders (i.e., assets) were analyzed based on their high likelihood of overloading. The results of the system analysis showed that only 91 of the 476 feeder (19%) had a forecasted overload sometime in the next 8 years (with a 5% resource adequacy buffer applied). Of those 91 forecasted overloaded feeders, a completely NWA solution to mitigate the capacity overload was feasible in only 51 instances; that is, 56% of the 91 forecasted overloaded feeders have overloads that can be met solely with DERs which equates to approximately 10.7% of the original 476 feeder population. Under the assumptions used in this demonstration project, an entirely NWA solution (i.e. no wires upgrades) was the lowest cost option on 32 feeders (35% of the 91 forecasted overloaded feeders; 6.7% of the 476). In the system demonstration traditional wires solutions were found to be more cost effective than DER portfolios 37% of the time (19 of the 51 feeders where a complete NWA solution was feasible).

For energy storage, some embodiments of the system can generate customer-specific 8,760 load shapes that consider the customer's historic usage patterns and rate tariff to determine an optimal dispatch profile that minimizes the customer's bill. Also included in some embodiments of the system are customer propensities for each DER technology; these propensities go beyond ensuring customers are eligible for DER technologies and programs, and uses demographic and historic program enrollment information to recommend specific DER technologies that are likely to benefit the customers. In some embodiments, detailed and granular recommendations are extremely valuable to distribution planning and the utility at large.

In some embodiments, the system can comprise a cloud-based computing platform that can incorporate back-end data and data engineering, analytics, and optimizations for a company's entire distribution service territory, (e.g., one that is not a limited 15% sample). In some embodiments, utilizing this type of on demand storage and computing power resources also reduces the utility's information technology (IT) overhead costs and maintenance responsibilities. In some embodiments, back-end scripts run efficiently and follow data engineering and analytics best-practices, allowing the entire system to be analyzed in orders of magnitude less time than previously. Further, in some embodiments, the use of open-source coding languages makes adding new features and troubleshooting much easier.

In some embodiments, using PySpark, the Python® API for Apache Spark® (a cluster-computing framework), makes it possible to scale the system to perform analysis of every asset associated with an entire electricity grid simultaneously. Further, in some embodiments, the use of data partitioning allows for increased parallelization during data engineering, reduces inefficient data processing, allows specific smaller pieces of data to be accessed for analytics, and allows certain pieces of data (i.e. partitions) to be read into memory only when needed. Furthermore, in some embodiments, the modularity of the system can allow new products and/or programs to be added and removed from the optimization formulations without restructuring the optimization formulation. In some embodiments, since the front-end (e.g., Tableau®) is independent of the back-end (e.g., AWS®), the front-end can evolve as business needs become more refined, and new features can be added as these needs develop according to some embodiments.

In some embodiments, the system can aid in motivating the businesses who develop and maintain the energy efficiency (EE), demand response (DR), distributed generation (DG), and energy storage (ES) inputs used in the optimization models to further improve upon their work and make it readily available for wider use. In some embodiments, the system can provide an analytics platform where future customer propensity models can be stored, documented, and run. Further, the system can comprise a platform where other DER models can be run, and their interaction affects researched.

In some embodiments of the invention, the system can use AWS®'s elastic cloud compute (EC2®), simple storage service (S3®), Redshift®, and Python® as the core language. In some embodiments, the system leverages Spark®'s Python® API, PySpark, for data engineering and to execute multiple optimizations in parallel, the number of optimizations only limited by the capability of the cloud network. In some embodiments, the Tableau® front end has a live connection to billions of record dataset that reside in AWS® Redshift®. In some embodiments, Tableau® can accommodate this large dataset through strategic partitioning of the data that is filtered on import to the front-end based on user interactions. Redshift® is a trademark or registered trademarks of Amazon Web Services, Inc.

Figure 11:
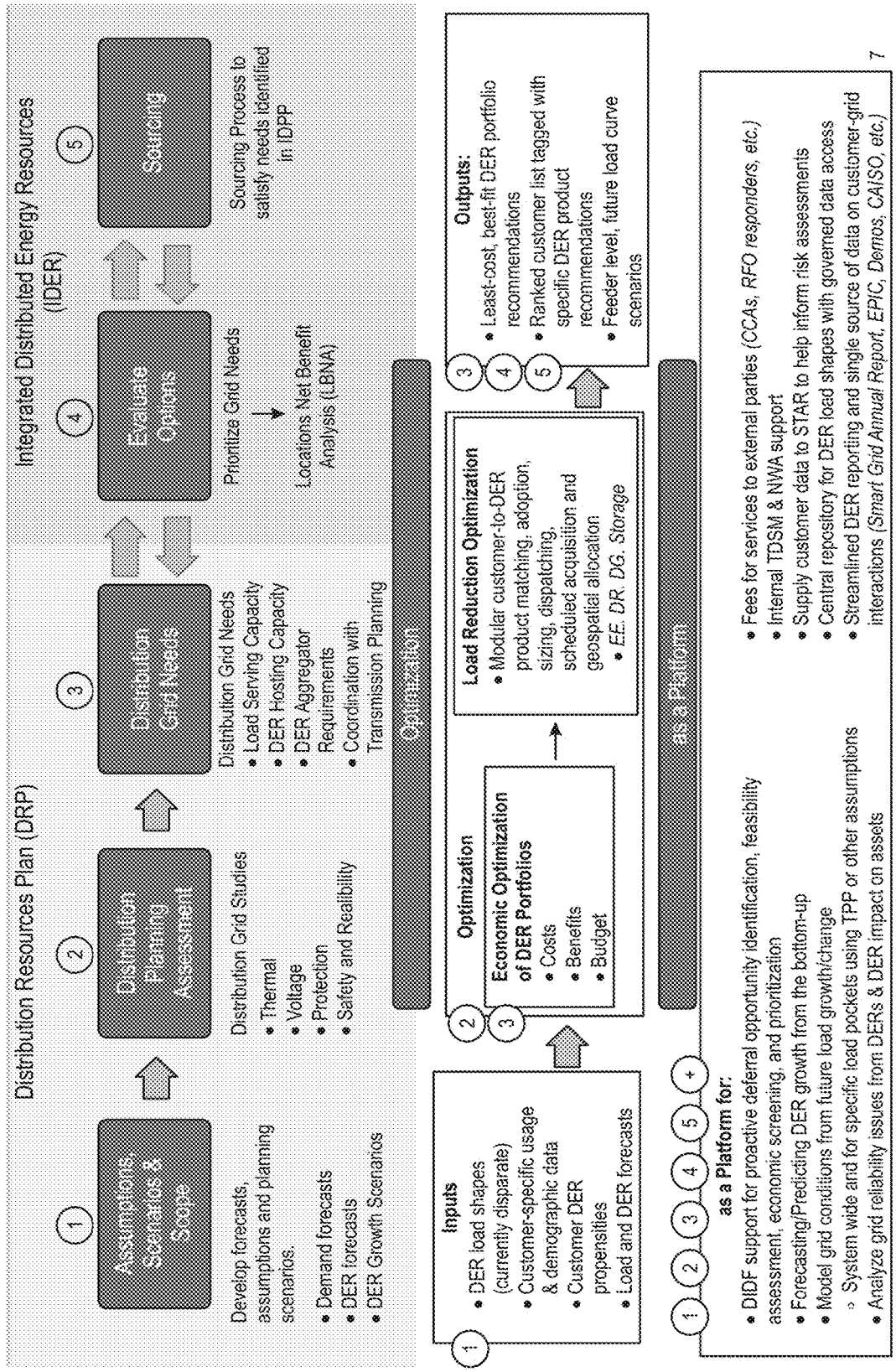
FIG. 11 demonstrates how the system fits into an integrated distribution planning framework for a company in accordance with some embodiments of the invention.

FIG. 11 demonstrates how the system fits into the utility's integrated distribution planning framework. In some embodiments, the system's mixed integer linear optimization objective function can compare non-wires alternative technologies to one another and to traditional wires solutions as well. In some embodiments, this creates data quality and data structure requirements for one or more backend script execution. Following the resolution of these constraints, and given the publication of the optimization objective function outlined in Equation 3 above, in some embodiments, the system's approach can be replicated at other utilities, by regulators, or by researchers.

Some embodiments can utilize rules surrounding DER dispatch, load shapes, etc. that are personalized to the geography and the load shape of specific customers. Similarly, customer propensities adoption results can be based on the demographic and propensity information available according to some embodiments.

Figure 12A:
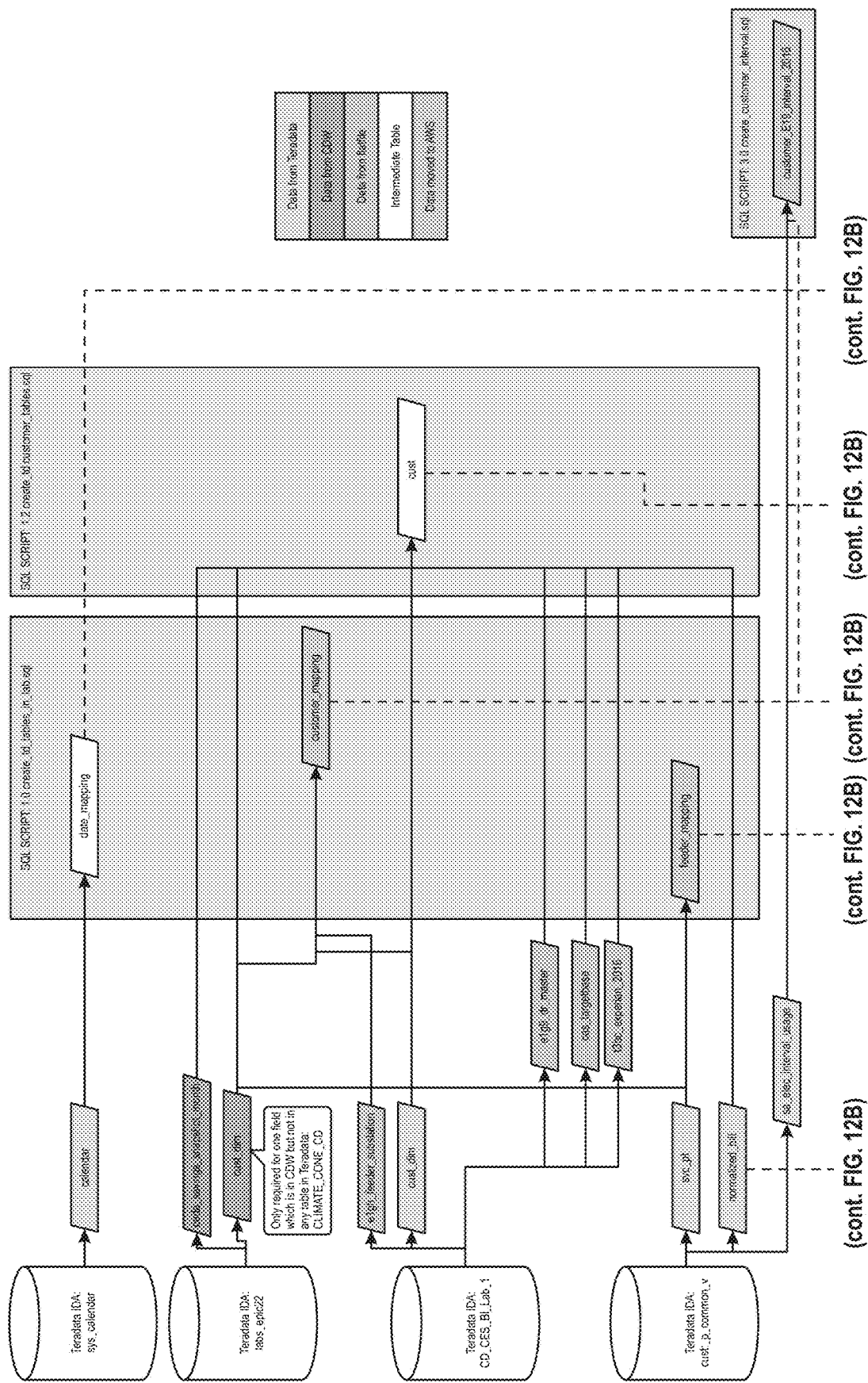
FIGS. 12A-12B show data flow architectures of the system in accordance with some embodiments of the invention.
Figure 12B:
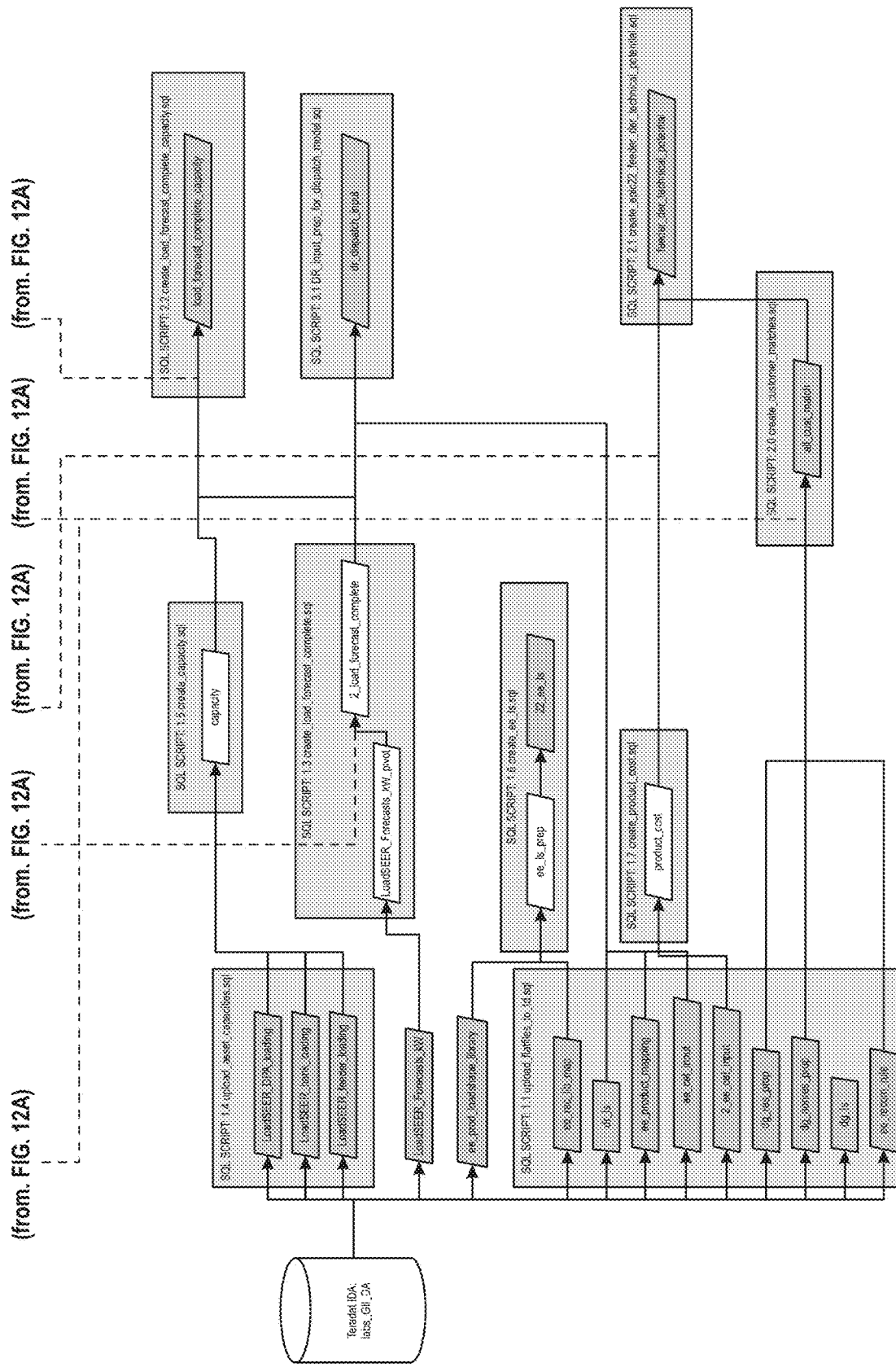
Figure 13A:
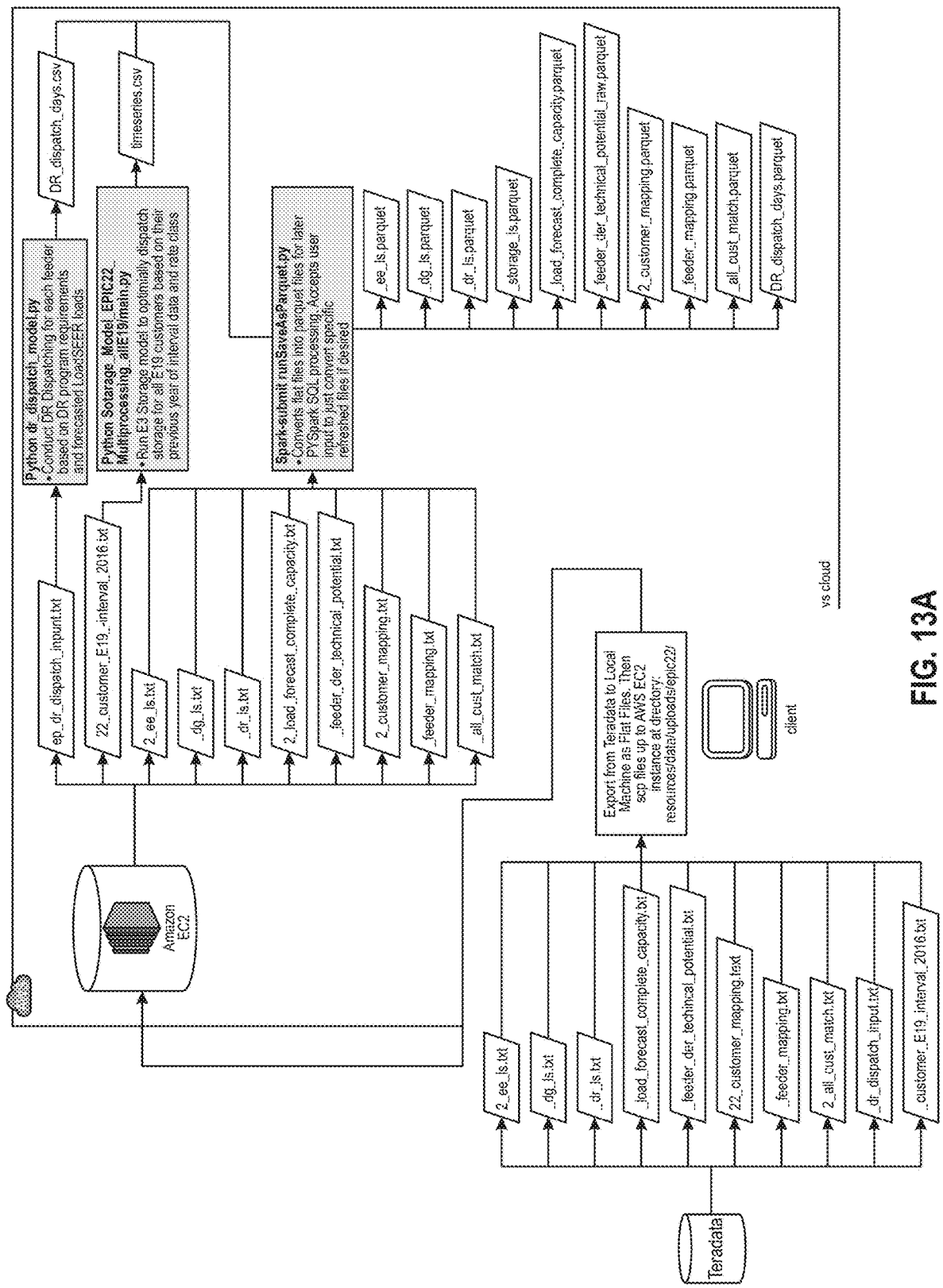
FIGS. 13A-13D show data flow architectures of the system in accordance with some embodiments of the invention.
Figure 13B:
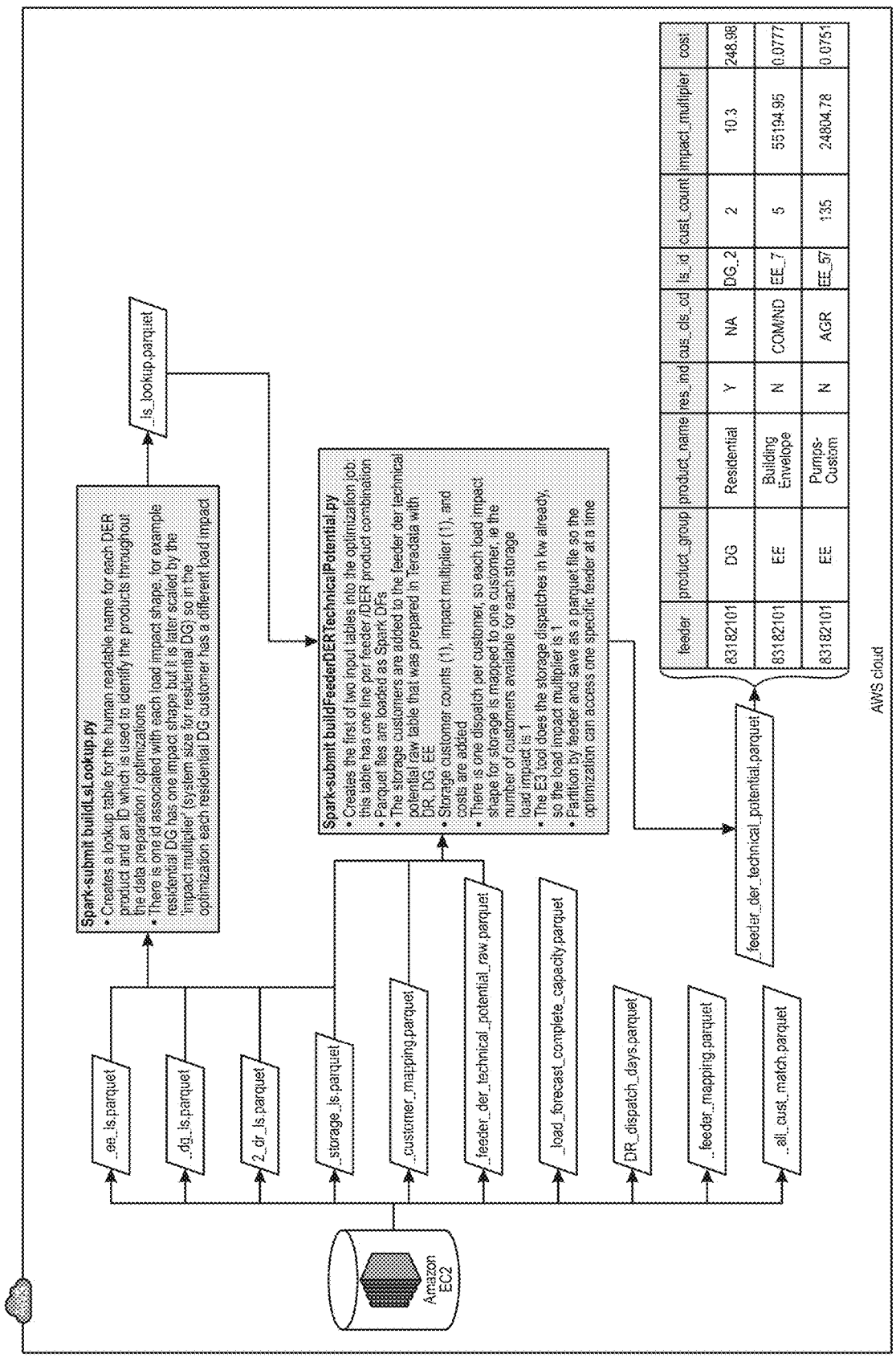
Figure 13C:
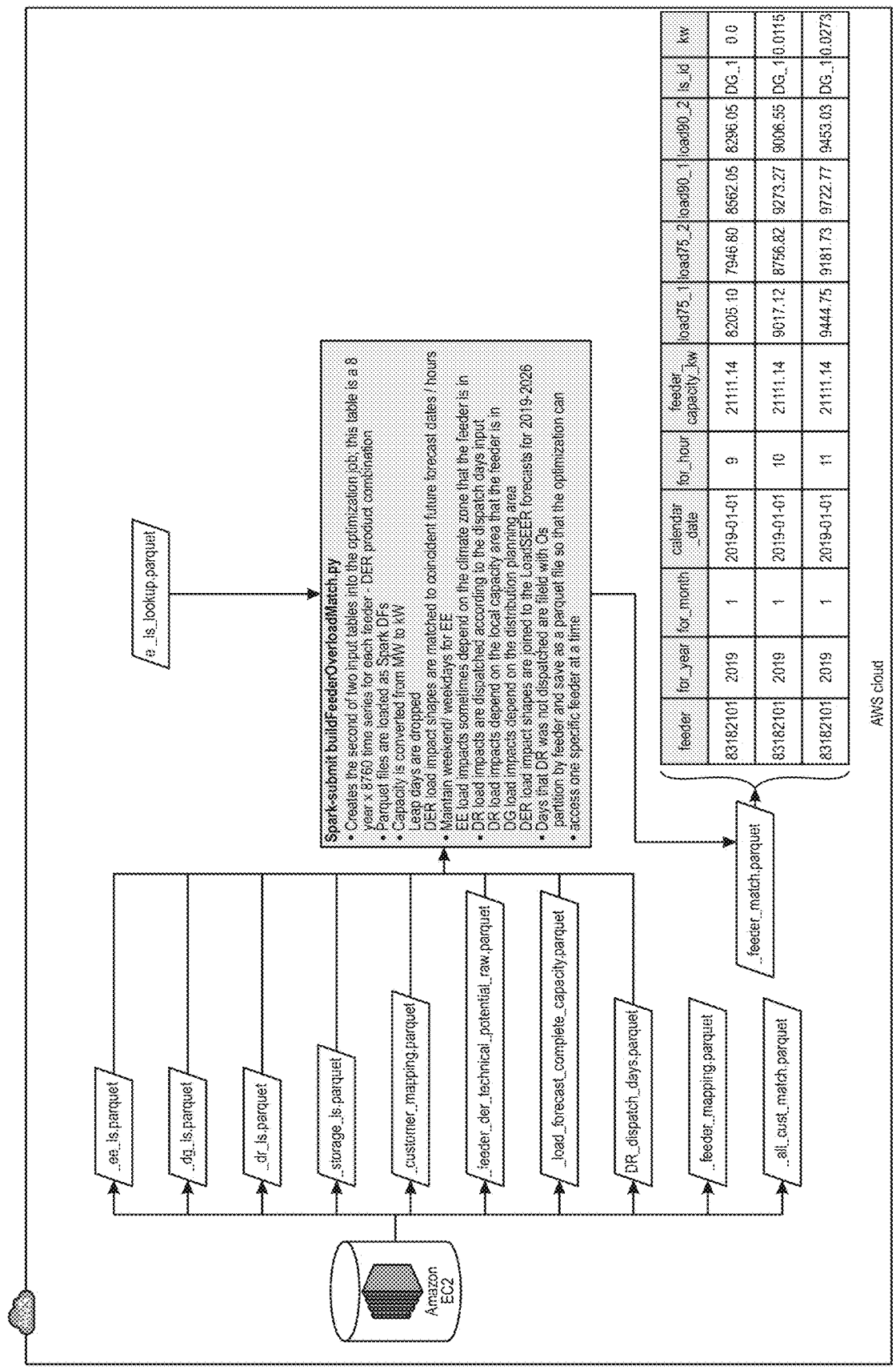
Figure 13D:
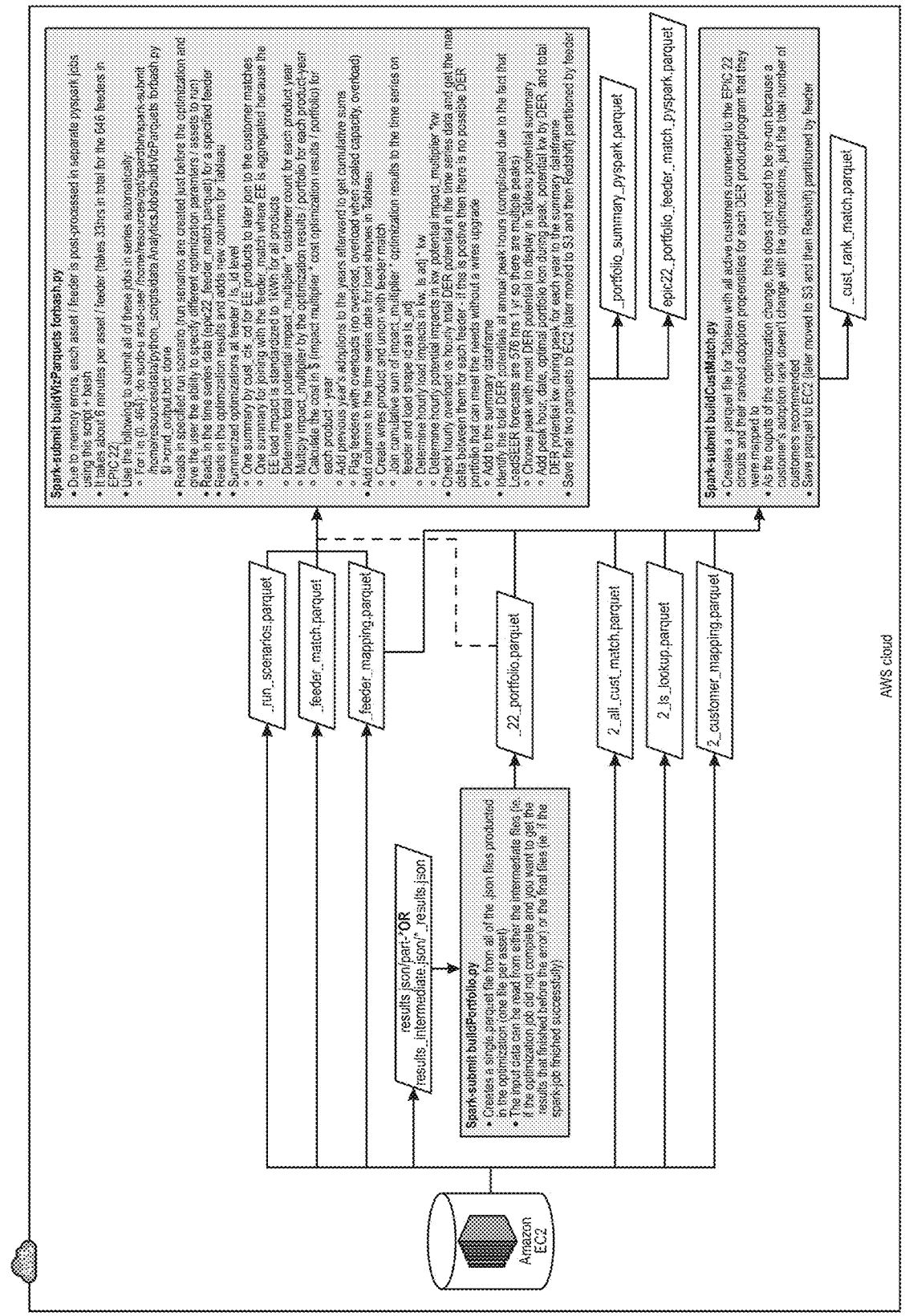
Figure 14:
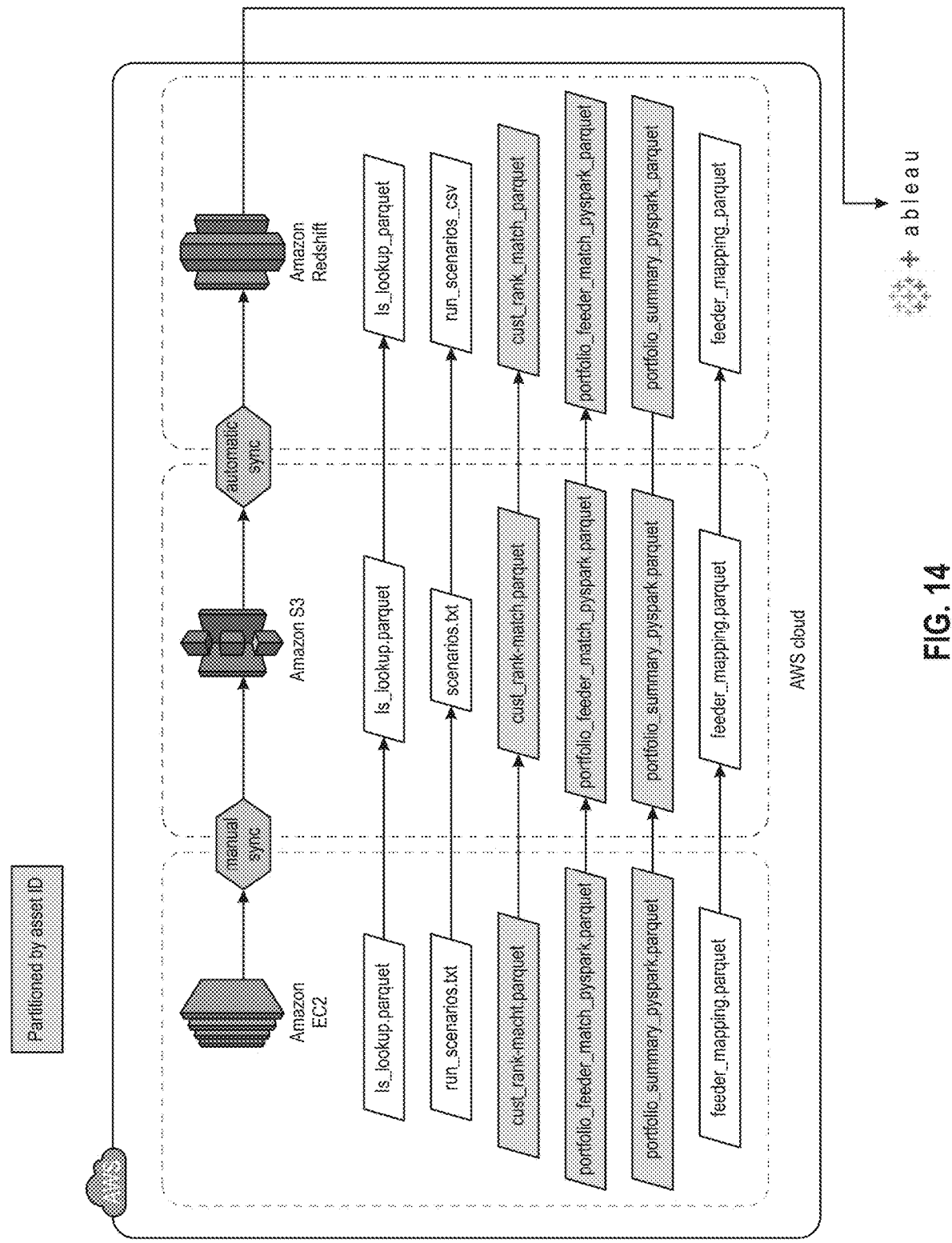
FIG. 14 shows a data visualization flow architecture of the system in accordance with some embodiments of the invention.

FIGS. 12A-12B show data flow architectures of the system in accordance with some embodiments of the invention. Further, FIGS. 13A-13D show data flow architectures of the system in accordance with some embodiments of the invention, and FIG. 14 shows data visualization flow architecture of the system in accordance with some embodiments of the invention.

Figure 15:
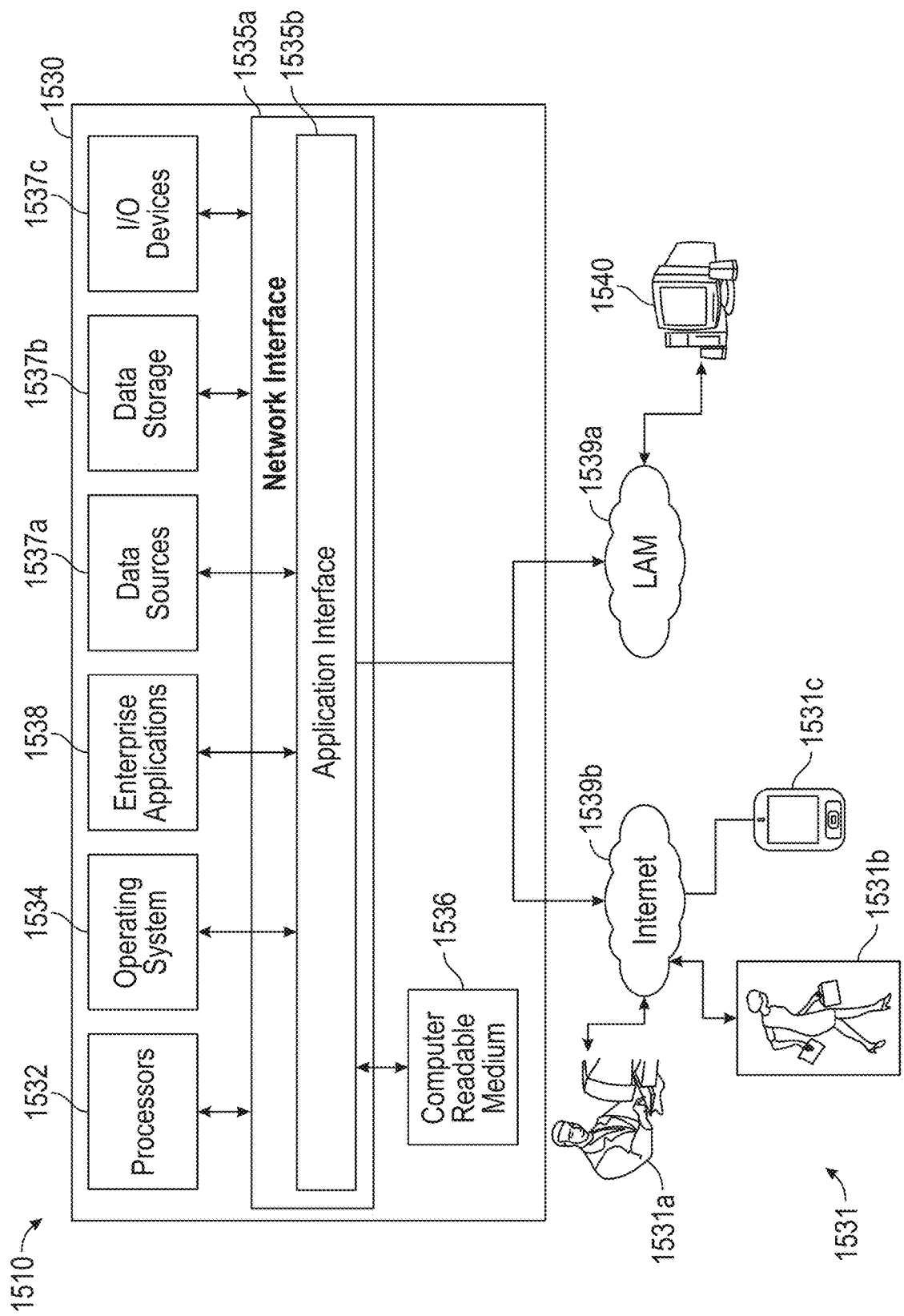
FIG. 15 illustrates a computer system configured for operating and processing components of the system in accordance with some embodiments of the invention.

FIG. 15 illustrates a computer system 1510 configured for operating and processing components of the system in accordance with some embodiments of the invention. For example, in some embodiments, the computer system 1510 can operate and/or process computer-executable code of one or more software modules of the aforementioned system. Further, in some embodiments, the computer system 1510 can operate and/or display information within one or more graphical user interfaces. In some embodiments, any of the system computing architecture of FIG. 2, and/or the architectures of FIGS. 12A-12B, 13A-13B, and 14 can couple to or comprise at least a portion of the computer system 1510.

In some embodiments, the system 1510 can comprise at least one computing device including at least one processor 1532. In some embodiments, the at least one processor 1532 can include a processor residing in, or coupled to, one or more server platforms. In some embodiments, the system 1510 can include a network interface 1550a and an application interface 1550b coupled to the least one processor 1532 capable of processing at least one operating system 1540. Further, in some embodiments, the interfaces 1550a, 1550b coupled to at least one processor 1532 can be configured to process one or more of the software modules (e.g., such as enterprise applications 1538). In some embodiments, the software modules 1538 can include server-based software that can include system software modules. In some embodiments, the software modules 1538 can operate to host at least one utility account and/or at least one client account, and operating to transfer data between one or more of these accounts using the at least one processor 1532.

With the above embodiments in mind, it should be understood that the invention can employ various computer-implemented operations involving system data stored in computer systems. Moreover, the above-described databases and models throughout the system can store analytical models and other data on computer-readable storage media within the system 1510 and on computer-readable storage media coupled to the system 1510. In addition, the above-described applications of the system can be stored on computer-readable storage media within the system 1510 and on computer-readable storage media coupled to the system 1510. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated. In some embodiments of the invention, the system 1510 can comprise at least one computer readable medium 1536 coupled to at least one data source 1537a, and/or at least one data storage device 1537b, and/or at least one input/output device 1537c. In some embodiments, the invention can be embodied as computer readable code on a computer readable medium 1536. In some embodiments, the computer readable medium 1536 can be any data storage device that can store data, which can thereafter be read by a computer system (such as the system 1510). In some embodiments, the computer readable medium 1536 can be any physical or material medium that can be used to tangibly store the desired information or data or instructions and which can be accessed by a computer or processor 1532. In some embodiments, the computer readable medium 1536 can include cloud storage, hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 1536 can transmit or carry instructions to a computer 1540 and/or at least one utility 1531, including a router, private or public network, or other transmission device or channel, both wired and wireless. In some embodiments, the software modules 1538 can be configured to send and receive data from a database (e.g., from a computer readable medium 1536 including data sources 1537a and data storage 1537b that can comprise a database), and data can be received by the software modules 1538 from at least one other source. In some embodiments, at least one of the software modules 1538 can be configured within the system to output data to at least one utility 1531 via at least one graphical user interface rendered on at least one digital display.

In some embodiments of the invention, the computer readable medium 1536 can be distributed over a conventional computer network via the network interface 1550a where the system embodied by the computer readable code can be stored and executed in a distributed fashion. For example, in some embodiments, one or more components of the system 1510 can be coupled to send and/or receive data through a local area network ("LAN") 1539a and/or an internet coupled network 1539b (e.g., such as a wireless internet). In some further embodiments, the networks 1539a, 1539b can include wide area networks ("WAN"), direct connections (e.g., through a universal serial bus port), or other forms of computer-readable media 1536, or any combination thereof.

In some embodiments, components of the networks 1539a, 1539b can include any number of devices such as personal computers including for example desktop computers, and/or laptop computers, or any fixed, generally non-mobile internet appliances coupled through the LAN 1539a. For example, some embodiments include personal computers 1540a coupled through the LAN 1539a that can be configured for any type of user including an administrator. Other embodiments can include personal computers coupled through network 1539b. In some further embodiments, one or more components of the system 1510 can be coupled to send or receive data through an internet network (e.g., such as network 1539b). For example, some embodiments include at least one utility 1531 coupled wirelessly and accessing one or more software modules of the system including at least one enterprise application 1538 via an input and output ("I/O") device 1537c. In some other embodiments, the system 1510 can enable at least one utility 1531 to be coupled to access enterprise applications 1538 via an I/O device 1537c through LAN 1539a. In some embodiments, the utility 1531 can comprise a utility 1531a coupled to the system 1510 using a desktop computer, and/or laptop computers, or any fixed, generally non-mobile internet appliances coupled through the internet 1539b. In some further embodiments, the utility 1531 can comprise a mobile utility 1531b coupled to the system 1510. In some embodiments, the utility 1531b can use any mobile computing device 1531c to wireless coupled to the system 1510, including, but not limited to, personal digital assistants, and/or cellular phones, mobile phones, or smart phones, and/or pagers, and/or digital tablets, and/or fixed or mobile internet appliances.

In some embodiments of the invention, the system 1510 can enable one or more utilities 1531 coupled to receive, analyze, input, modify, create and send data to and from the system 1510, including to and from one or more enterprise applications 1538 running on the system 1510. In some embodiments, at least one software application 1538 running on one or more processors 1532 can be configured to be coupled for communication over networks 1539a, 1539b through the internet 1539b. In some embodiments, one or more wired or wirelessly coupled components of the network 1539a, 1539b can include one or more resources for data storage. For example, in some embodiments, this can include any other form of computer readable media in addition to the computer readable media 1536 for storing information, and can include any form of computer readable media for communicating information from one electronic device to another electronic device.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the present invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A system for optimizing electrical assets comprising:
a modeling program stored on one or more non-transitory computer readable media configured and arranged to allow a user to create a mixed integer programming model;
at least one solver program stored on the one or more non-transitory computer readable media configured and arranged to solve the mixed integer programming model;
a communications network configured to receive data from a plurality of assets within an electrical utility grid;
a database configured and arranged to store the data for the plurality of assets;
a graphical user interface configured to enable a user to select one or more of the plurality of assets for electrical utility grid optimization;
a plurality of processor cores, each core configured and arranged to execute one solver instance of the at least one solver program sequentially, wherein the plurality of processor cores are executable in parallel; and
an architecture program configured and arranged to distribute an optimize function from a linear program optimization script to each of the plurality of processor cores to execute steps defined by the mixed integer programming model;
wherein the modeling program, the at least one solver program, and the architecture program are each configured and arranged to operate independently;
wherein the mixed integer programming model comprises the following steps:
  i) run an optimization for at least one asset of an asset load profile for a current year,
  ii) return an optimal portfolio for the at least one asset for the current year,
  iii) subtract the optimal portfolio for the at least one asset for the current year from the asset load profile,
  iv) run each asset optimization for a next year; and
  v) repeat for all years where an asset optimization is desired,
  vi) identify an individual customer to market a portfolio based on a propensity score determined by the mixed integer programming model;
wherein the system executes multiple instances of the mixed integer programming model.

2. The system of claim 1, wherein the modeling program is configured and arranged to specify the at least one solver program used to solve the mixed integer programming model.

3. The system of claim 1, wherein the architecture program is configured and arranged to receive a linear programming script representing the mixed integer programming model from the modeling program.

4. The system of claim 3, wherein the architecture program is configured and arranged to assign an executor to one or more of the plurality of processor cores.

5. The system of claim 4, wherein the architecture program is configured and arranged to pass a solver function from the linear programming script to each of the plurality of processor cores, the solver function comprising at least a portion of the mixed integer programming model.

6. The system of claim 5,
wherein the architecture program further comprises a map function;
wherein the map function is configured and arranged to map at least a one portion of raw data from the database to one executor assigned to one core, and map a different portion of the raw data to a different executor assigned to a different core; and
wherein a portion of the raw data that has been mapped is a mapped raw data set.

7. The system of claim 6,
wherein the architecture program is configured and arranged to pass the linear programming script to each assigned executor; and
wherein the linear programming script comprises at least the portion of the mixed integer programming model from the modeling program.

8. The system of claim 7,
wherein the mapped raw data set is used by the solver function; and
wherein each of the plurality of processor cores executes the linear programming script in each assigned executor in parallel.

9. The system of claim 8,
wherein when the solver function completes execution, a different mapped raw data set is passed to the solver function.

10. The system of claim 1,
wherein the modeling program is configured and arranged to read a partition for each of the plurality of assets into the database,
wherein the modeling program is configured and arranged to assign a partition ID to each partition; and
wherein the mixed integer programming model is created independent of the at least one solver program and the architecture program.

11. The system of claim 1,
wherein the at least one solver program is a plurality of solver programs;
wherein each of the plurality of solver programs is configured and arranged to solve the mixed integer programming model for each of the plurality of assets sequentially;
wherein the one solver instance comprises any one of the plurality of solver programs; and
wherein each one solver instance executing on each of the plurality of processor cores executes independently of each other.

12. The system of claim 1,
wherein a cloud based infrastructure comprises the database and the plurality of processor cores;
wherein a number of the plurality of processor cores is scalable such that a number of cores the system uses can be removed or added; and
wherein adding or removing cores does not require modification of the modeling program, the at least one solver program, or the architecture program.

13. The system of claim 1, wherein at least one of the plurality of processor cores is a virtual processor.

14. The system of claim 1,
wherein the architecture program is configured and arranged to receive a linear programming script representing the mixed integer programming model from the modeling program;
wherein the architecture program is configured and arranged to assign an executor to one or more of the plurality of processor cores;
wherein the architecture program is configured and arranged to pass the linear programming script to each assigned executor; and
wherein the architecture program is configured and arranged to pass a solver function to each assigned executor.

15. The system of claim 1,
wherein the system is configured and arranged to use the modeling program to create the linear program optimization script;
wherein the modeling program is configured and arranged to specify any one of a plurality of different solver programs to use to solve the mixed integer programming model for a particular processing core;
wherein the modeling program is configured and arranged to specify different solver programs for different assets and/or a same solver program for all assets;
wherein the architecture program is configured and arranged to pass a linear programming script to each assigned executor; and
wherein the architecture program is configured and arranged to control a distribution of the data for the plurality of assets among the plurality of processor cores, such that each processor core is executing an optimization function sequentially while at least a portion of the plurality of processor cores are executing in parallel.

16. The system of claim 1,
wherein the system executes the multiple instances of the mixed integer programming model on two or more of the plurality of processor cores in parallel.

17. The system of claim 1,
further comprising a step of preparing mixed integer programming model results for a data visualization software.

* * * * *